(12) United States Patent
Schilling et al.

(10) Patent No.: US 12,115,722 B2
(45) Date of Patent: Oct. 15, 2024

(54) FLOW DEVICE AND FLOW METHOD FOR AN ADDITIVE MANUFACTURING DEVICE AND AN ADDITIVE MANUFACTURING DEVICE WITH SUCH A FLOW DEVICE

(71) Applicant: EOS GmbH Electro Optical Systems, Krailling (DE)

(72) Inventors: Alexander Schilling, Wildpoldsried (DE); Sebastian Mehl, Puchheim (DE); Franz-Josef Kerl, Kumhausen (DE)

(73) Assignee: EOS GmbH Electro Optical Systems, Krailling (DE)

( * ) Notice: Subject to any disclaimer, the term of this patent is extended or adjusted under 35 U.S.C. 154(b) by 678 days.

(21) Appl. No.: 17/289,952

(22) PCT Filed: Nov. 6, 2019

(86) PCT No.: PCT/EP2019/080396
§ 371 (c)(1),
(2) Date: Apr. 29, 2021

(87) PCT Pub. No.: WO2020/099214
PCT Pub. Date: May 22, 2020

(65) Prior Publication Data
US 2022/0009001 A1 Jan. 13, 2022

(30) Foreign Application Priority Data
Nov. 12, 2018 (DE) .......................... 102018219304.5

(51) Int. Cl.
*B33Y 10/00* (2015.01)
*B22F 10/28* (2021.01)
(Continued)

(52) U.S. Cl.
CPC ............ *B29C 64/153* (2017.08); *B22F 10/28* (2021.01); *B22F 10/322* (2021.01); *B22F 12/20* (2021.01);
(Continued)

(58) Field of Classification Search
CPC ..... B29C 64/153; B29C 64/371; B22F 10/28; B22F 10/322; B22F 12/20; B22F 12/70;
(Continued)

(56) References Cited

U.S. PATENT DOCUMENTS 6,583,379 B1    6/2003   Meiners et al.
2017/0216916 A1* 8/2017  Nyrhilä ................ B22F 10/322
(Continued)

FOREIGN PATENT DOCUMENTS

CN   108349161    7/2018
CN   108407292    8/2018
(Continued)

OTHER PUBLICATIONS

PCT Search Report for Application No. PCT/EP2019/080396 dated Jan. 28, 2020, 4 pages.
(Continued)

*Primary Examiner* — Rebecca Janssen
(74) *Attorney, Agent, or Firm* — Polsinelli PC

(57) ABSTRACT

Disclosed is a flow device for an additive manufacturing device. The device includes a gas supply line located outside the process chamber to conduct gas to a gas inlet. The gas supply line includes a first line section extending in a first extension direction and a maximum width that extends transverse to the first extension direction and parallel to the build area. A length of the first line section is at least half as large as the maximum value of the width. The first line section also includes a first subsection spaced from the gas inlet and including a first flow conditioning unit and a wall
(Continued)

of the first line section. The first flow conditioning unit substantially aligns the gas stream in the first extension direction.

16 Claims, 6 Drawing Sheets

(51) Int. Cl.
    *B22F 10/322*     (2021.01)
    *B22F 10/77*     (2021.01)
    *B22F 12/20*     (2021.01)
    *B22F 12/70*     (2021.01)
    *B29C 64/153*     (2017.01)
    *B33Y 30/00*     (2015.01)
    *B22F 12/17*     (2021.01)

(52) U.S. Cl.
    CPC .............. *B22F 12/70* (2021.01); *B33Y 10/00* (2014.12); *B33Y 30/00* (2014.12); *B22F 10/77* (2021.01); *B22F 12/17* (2021.01)

(58) Field of Classification Search
    CPC .......... B22F 10/77; B22F 12/17; B33Y 10/00; B33Y 30/00; C04B 2235/6026; C04B 2235/665; Y02P 10/25
    See application file for complete search history.

(56) References Cited

U.S. PATENT DOCUMENTS

| | | | |
|---|---|---|---|
| 2018/0126460 A1* | 5/2018 | Murphree | .............. B33Y 40/00 |
| 2018/0133967 A1 | 5/2018 | Bechmann et al. | |
| 2018/0236550 A1 | 8/2018 | Herzog | |
| 2018/0318927 A1 | 11/2018 | Baumann | |
| 2020/0298480 A1 | 9/2020 | Haerst et al. | |

FOREIGN PATENT DOCUMENTS

| | | | |
|---|---|---|---|
| CN | 108407292 A | * | 8/2018 |
| DE | 19853947 | | 2/2000 |
| DE | 102009048797 | | 3/2011 |
| DE | 102013211672 | | 12/2014 |
| DE | 102014205875 | | 10/2015 |
| DE | 202014205875 | | 10/2015 |
| DE | 102015121748 | | 6/2017 |
| DE | 102016121770 | | 5/2018 |
| JP | 2018003148 | | 1/2018 |
| WO | 2015189619 | | 12/2015 |
| WO | 2019068581 A1 | | 4/2019 |

OTHER PUBLICATIONS

German Search Report for Application No. 102018219304.5 dated Jul. 16, 2019, 3 pages.
DE 19853947 corresponds to U.S. Pat. No. 6,583,379.
DE 102016121770 corresponds to U.S. Patent Publication No. 2018/0133967.
DE 102015121748 corresponds to U.S. Patent Publication No. 2018/0236550.
DE 102014205875 corresponds to U.S. Patent Publication No. 2017/0216916.

* cited by examiner

FLOW DEVICE AND FLOW METHOD FOR AN ADDITIVE MANUFACTURING DEVICE AND AN ADDITIVE MANUFACTURING DEVICE WITH SUCH A FLOW DEVICE

TECHNICAL FIELD OF THE INVENTION

The present invention relates to a flow device and a flow method for an additive manufacturing device for the production of a three-dimensional object by layer-wise selective solidification of a building material.

BACKGROUND OF THE INVENTION

Devices and methods of this type are used, for example, in rapid prototyping, rapid tooling or additive manufacturing. An example of such a process is known as "selective laser sintering or laser melting". In this process, a thin layer of a building material in powder form is repeatedly applied and the building material is selectively solidified in each layer by selectively irradiating locations that correspond to a cross-section of the object to be produced by a laser beam.

The energy input during selective solidification can cause impurities such as splatters, fumes, smoke, vapors and/or gases that spread from the build area into the process chamber. In addition, when using a building material in powder form, impurities can arise from powder or powder dust being whirled up in the process chamber. Impurities can negatively affect the manufacturing process, for example by absorbing, scattering or deflecting the scanning laser beam, by depositing on a coupling window for the laser beam or depositing on a layer of building material. In order to meet high quality and efficiency requirements for the manufacturing process, such impurities must therefore be removed from the process chamber as quickly as possible.

For this purpose, a gas stream is generally introduced into the process chamber through a gas inlet in a lower height region of the process chamber and discharged therefrom through a gas outlet so that a gas stream is generated that is directed substantially from the gas inlet to the gas outlet, hereinafter also referred to as a main stream or main gas flow. The gas stream usually proceeds in an unguided manner in the process chamber itself, i.e. after entering the process chamber the gas is not directed by a device comprising a narrow cavity, such as a pipe or a channel.

To this end, DE 198 53 947 C1 describes a process chamber whose side walls have first inlet openings and outlet openings for a first gas. In an elevated area of the side walls close to the ceiling second inlet openings for a second gas with a lower density are provided. During operation, a buffer volume of the second lighter gas thus forms in the elevated area of the process chamber and a protective gas flow over the processing surface is formed.

SUMMARY OF THE INVENTION

It is the object of the present invention to provide an alternative or improved flow device and an alternative or improved flow method for a process chamber for an additive manufacturing device for producing a three-dimensional object by layer-wise selective solidification of a building material, with which in particular the efficiency of the removal of impurities from the process chamber can be increased, which impurities arise, among other things, during the selective solidification of the building material.

This object is achieved by a flow device according to claim 1, an additive manufacturing device according to claim 14, a flow method according to claim 15 and a manufacturing method according to claim 16. Further developments of the invention are given in the dependent claims each. The methods can also be further developed by the features of the devices, which features are given below or set out in the dependent claims, or vice versa, and the features of the devices can be used for further development among one another, as well as the features of the methods.

According to the invention, a flow device for an additive manufacturing device for the production of a three-dimensional object by layer-wise selective solidification of a building material in a build area comprises a process chamber, a gas supply device for generating a gas stream in the additive manufacturing device, at least one gas inlet for introducing the gas stream into the process chamber and at least one gas outlet for directing the gas stream out of the process chamber, and a gas supply line which is provided outside the process chamber in order to conduct gas to the at least one gas inlet, the gas supply line comprising at least a first line section that adjoins the gas inlet and that extends a length along a first extension direction of the gas supply line, wherein the first extension direction is substantially straight, and wherein the first line section extends a maximum value of a width that extends transverse to the first extension direction and parallel to the build area, and wherein the length of the first line section is at least as large as one half of the maximum value of the width, and wherein the first line section further comprises a first subsection that is arranged at a distance from the gas inlet and which comprises at least a first flow conditioning unit in addition to a wall of the first line section, the first flow conditioning unit being designed to substantially align the gas stream in the first extension direction.

The process chamber is understood to mean a cavity delimited by a process chamber wall. Downwards, i.e. towards its bottom, the process chamber preferably is at least partially delimited by the build area in or on which the three-dimensional object can be produced. Preferably, a building container for the three-dimensional object to be produced is provided below the build area. A solidification device can be arranged above the process chamber, which solidification is configured to direct an energetic radiation for the selective solidification of the building material through the process chamber onto the build area, for example. With the exception of the gas inlet and the gas outlet and possibly further gas inlets and/or gas outlets provided, the process chamber can be a substantially closed cavity at least in an operating state or during its intended operation.

A gas supply line is preferably understood to mean a stiff, i.e. a rigid or non-flexible, line or a rigid channel, such as a sheet metal channel. A gas supply device can comprise a drive means for moving a gas volume, such as a blower. If the process chamber where a flow is to be generated and the gas supply line are part of a series of gas-carrying channels or chambers, e.g. of a closed process gas circulation system or a closed process gas circuit, for example, a single drive means can be sufficient to move the gas within the entire system in a preferential direction. A gas stream is understood to be a volume of gas that is specifically moved in a preferential direction.

The first line section of the gas supply line adjoining the gas inlet means that the gas inlet spatially separates the interior of the process chamber and the first line section in certain areas and provides a gas conducting spatial connection to the gas inlet. During intended operation, the first line section of the gas supply line is located directly upstream of the gas inlet. At the gas inlet or in the form of the gas inlet, there is preferably a cross-sectional narrowing of the gas supply line by at least 10%, for example 20% or 30%, i.e. the cross-sectional area of the first line section at the interface with the process chamber is smaller by a respective value than a cross-sectional area of the first line section upstream of the gas inlet. Typically, a cross-sectional area of the process chamber directly downstream of the gas inlet is larger than the cross-sectional area of the first line section by a multiple, for example, five or ten times.

The first extension direction being "substantially" straight means that the extension direction can deviate from a straight line to a small extent and/or in some areas by 10° at most, preferably by 5° at most, particularly preferably by 1° at most. The first extension direction proceeds through the centroids of the cross-sectional areas of the first line section, which are preferably determined perpendicular to the extension direction. The cross-section or the cross-sectional area of the first line section can be variable over its length. Thus, for example, the first line section can also have a completely straight extension direction in the case that a plurality of differently sized and/or shaped cross-sections or cross-sectional areas "coaxially" adjoin one another, with the common "axis" (identical here to the extension direction) passing through the centroids of the cross-sectional areas. Preferably, the first line section extends over its entire length in the first extension direction, i.e. it does not have a second extension direction deviating from the first extension direction.

The "maximum value of the width" of the first line section also takes into account such variable cross-sections or cross-sectional areas along the first extension direction. Moreover, this term expresses that it does not imply a reduced width of the first line section, which can be caused, for example, by constrictions or flow channels in the first subsection formed by the first flow conditioning unit. Rather, the term "maximum value of the width" refers to the largest width or width dimension in the first line section, such as can be formed between the outer wall of the line section. In summary, the maximum value of the width refers to the distance between a first outermost end and a second outermost end of the gas supply line along the width.

That the first flow conditioning unit is provided in addition to a wall of the first line section means that the first flow conditioning unit is not formed by the wall alone, i.e. the inner surfaces of an outer boundary of the line section. The first flow conditioning unit is arranged within a cavity of the first line section, which conducts the gas during operation. It is arranged at a distance to the wall at least in some areas and thus causes an internal division of the first line section at least in some areas.

The term "align(ing)" means to bring the gas stream into a specific uniform direction, i.e. the first extension direction. Here, the term "substantially" expresses that directional deviations of 15° at most, preferably 10° at most, further preferably 5° at most are included, i.e. that the gas stream need not be completely aligned in a single direction. Such directional deviations can, for example, concern partial gas streams. Further, the term "substantially" also expresses that turbulence can occur in a range of magnitudes which can in particular be predetermined by the first flow conditioning unit, for example, by a distance of guide faces of guide elements of the first flow conditioning unit from one another and/or a dimension of flow channels formed between the guide elements or guide faces at least partially or in sections. Such guide elements and guide faces will be described in more detail below.

By providing a first line section whose length has a proportion to the maximum value of the width of at least 0.5, for example, a sufficient streaming length of the gas stream directly before the gas inlet can be provided, which can cause flow calming and/or flow homogenization of the gas stream. The first flow conditioning unit can thereby lead, for example, to a further calming of the gas stream, in particular by subdividing the first subsection, and/or to a more homogeneous distribution of the volume flow or mass flow and/or of pressure ratios in the flow across its cross-section (i.e. perpendicular to the first extension direction), in particular by reducing (large-scale) turbulences in the flow or by guiding the flow in the flow conditioning unit at least in sections.

The area-wise internal division of the first line section by means of the flow conditioning unit causes a division of the gas stream, which can reduce an expansion of turbulence within the first line section.

In particular, the area-wise internal division of the first line section can cause an effective cross-sectional reduction or variation of the effective width, which can lead to more favorable flow properties (even after the gas stream enters the process chamber) than a cross-sectional variation by varying the maximum width, such as can result from a change in the cross-section of the outer wall of the gas supply line. In the latter case, bundling or widening of an entire gas stream is effected, which favors large-scale generation of turbulence. The gas stream can also be given a global converging or diverging direction as a result. The gas stream can also maintain this large-scale direction as it enters the process chamber. Within the process chamber, however, the aim is typically to achieve a flow across the build area with the width of the gas stream remaining as constant as possible, especially in the case of a rectangular build area. A reduction in cross-section here does not necessarily mean a change in the global direction of the gas stream, but can be in accordance with a straight extension direction of the first line section and the gas flowing therein.

In addition, the above-described design of the first line section allows the gas stream to retain the width it has when passing through the gas inlet for longer, even after entering the process chamber, since it passes the gas inlet substantially straight and not, for example, substantially obliquely (converging or diverging). As a result, a respective requirement for the properties of the gas stream near the bottom above the build area within the process chamber, which gas stream can be generated by the flow device according to the invention, can be better fulfilled.

Preferably, the length of the first line section is at least as large as the maximum value of the width of the first line section, further preferably at least one and a half times, even more preferably at least two times, particularly preferably at least three times larger than the maximum value of the width of the first line section.

This provides, for example, for an even larger streaming length of the gas stream directly upstream of the gas inlet, which can effect a further improvement in the flow properties of the gas stream introduced into the process chamber through the first line section and the gas inlet.

Preferably, the first extension direction is substantially parallel to a plane of the build area, in particular substantially parallel to a mean inflow direction in which partial streams of the gas substantially flow through the gas inlet into the process chamber during operation of the flow device. Alternatively or in addition, the maximum value of the width of the first line section, further preferably a maximum value of a cross-sectional are of the first line section perpendicular to the first extension direction, is substantially constant along the length of the first line section and/or a maximum cross-sectional area of the first line section perpendicular to the first extension direction has a substantially rectangular shape.

The term "substantially" expresses that directional deviations of up to 15°, preferably up to 10°, more preferably up to 5° are included. Alternatively or additionally, the first extension direction can be substantially perpendicular to a wall of the process chamber, in which wall the at least one gas inlet is provided, and/or perpendicular to a reference plane in which gas inlet openings of the gas inlet are provided and/or parallel to a mean main flow direction of the gas in the process chamber from the gas inlet to the gas outlet. In particular, this means that the straight extension direction follows a straight connecting line between two locations, namely a first end and a second end of the first line section. In other words, this direction describes a global or averaged direction of the gas volume flowing in the first line section during operation of the flow device according to the invention.

This can have the effect, for example, that no or only minor further changes in direction are necessary for introducing the gas into the process chamber. In general, the straight extension direction of the first line section parallel to the build area and parallel to the mean inflow direction of the partial streams avoids a change in direction, e.g. due to a bending and/or curvature of the pipe. This, in particular in conjunction with a constant maximum value of the width or cross-sectional area of the first line section perpendicular to the first extension direction, can lead to an improvement in the flow properties, in particular effect a more homogeneous and/or more uniform and/or less turbulent flow. In addition, angles of inclination or opening angles of the first line section are reduced or avoided, which can lead to detachment of the flow from the wall starting from 4° (angle of inclination of the wall) or from 8° (conical opening angle). A rectangular cross-section of the first line section is advantageous, especially in connection with a rectangular gas inlet.

Preferably, the maximum value of the width of the first line section is larger than or equal to a maximum dimension of the build area in a direction parallel to the width of the first line section.

This makes it possible, for example, to easily introduce a gas stream into the process chamber, which gas stream flows across the build area with its entire width.

The maximum dimension of the build area in a direction parallel to the width of the first line section, for example a diameter of a circular build area or a side length of a rectangular build area, is preferably at least 10 cm, more preferably at least 20 cm, even more preferably at least 30 cm. Thus, for example, a sufficient width and thus also a sufficient length of the first line section can be provided, which can lead to a good or sufficient improvement of the flow properties or flow calming.

Preferably, the gas inlet comprises a flow modification element having a number of gas inlet openings arranged at a distance from one another for introducing the gas into the process chamber, further preferably the flow modification element comprises a plurality of gas inlet channels for introducing the gas into the process chamber, wherein at least an end portion of the gas inlet channels extends in the first extension direction. In particular in combination with such a flow modification element a good effect of the gas supply line described above can be achieved, for example.

Preferably, the gas inlet is provided substantially within a lower height region of the process chamber. A lower height region of the process chamber refers to a region of the process chamber that is close to the build area, i.e., remote from the ceiling, i.e. a region that is located closer to the build area than to the process chamber ceiling. Further preferably, the lower height region of the process chamber in which the gas inlet is provided corresponds to a lower third, even more preferably a lower fifth, particularly preferably a lower tenth of a maximum distance of the build area from a process chamber ceiling, i.e. a maximum clear process chamber height, i.e. a maximum vertical extension of the process chamber. The term "substantially within a lower height region" implies that the gas inlet is designed and arranged in the process chamber such that it protrudes from the lower height region only within a tolerance range of 5% of a process chamber height corresponding to the height region. In particular, in connection with such a gas inlet close to the build area a good effect of the gas supply line described above can be achieved, for example.

Alternatively or in addition to the above-described gas inlet being close to the build area, the gas inlet can be provided substantially outside of the above-described lower height region of the process chamber. In particular, the gas inlet can be arranged in an upper height region of the process chamber, the upper height region preferably corresponding to an upper tenth of a distance of the build area from a process chamber ceiling. Thus, for example, the first line section can also be used for introducing a gas into the process chamber through an upper gas inlet, i.e. a ceiling gas inlet.

Preferably, the first flow conditioning unit comprises a number of guide elements having guide faces and the first flow conditioning unit has at least one, preferably at least two, of the following properties:

- the guide faces of the guide element or guide elements are aligned in the first extension direction;
- at least two guide elements are arranged spaced apart from one another along the width of the first line section and preferably have an average spacing along the width of at least 5 mm, more preferably of at least 10 mm, even more preferably of at least 20 mm and/or of 200 mm at most, more preferably of 100 mm at most, even more preferably of 50 mm at most;
- at least two guide elements are arranged spaced apart from one another along a height of the first line section, the height being a dimension of the first line section perpendicular to the first extension direction and perpendicular to the width of the first line section, and preferably have an average spacing along the height of at least 5 mm, further preferably of at least 10 mm, even more preferably of at least 15 mm and/or of 50 mm at most, further preferably of 40 mm at most, even more preferably of 30 mm at most;
- at least two guide elements are arranged separated from each other at least partially and/or at least in some areas;
- along the length of the first line section the guide element(s) has/have a dimension of at least 1 cm, preferably of at least 5 cm, further preferably of at least 10 cm, even more preferably of at least 20 cm and/or of 100 cm at most, preferably of 50 cm at most;
- the first flow conditioning unit comprises at least 5, preferably at least 10, more preferably at least 20, even more preferably at least 30 guide elements;
- a reduction in the cross-sectional area of the first line section in the first subsection caused by the first flow conditioning unit as compared to a maximum value of the cross-sectional area of the first subsection is at least 1%, preferably at least 2%, particularly preferably at least 5% and/or 30% at most, preferably 20% at most, particularly preferably 10% at most;

at least two guide elements are spaced apart from one another along the width and/or the height of the first line section by a first distance and extend in a direction parallel to the first extension direction by a second distance, the second distance being at least ten times, preferably twenty times, even more preferably thirty times, greater than the first distance.

The guide elements can be formed, for example, as rolled sheets and/or as extruded sections and/or as tubes.

The term "partially separated from each other" means that the guide elements are at least partially spaced apart from one another, i.e. not all the guide elements are connected to one another but, for example, only three quarters of the guide elements are connected to one another. The term "separated from each other in some areas" means that the guide elements are spatially separated from one another but are connected to one another, e.g. via a common base.

As a result, flow channels are formed between adjacent guide elements or their respective guide faces and/or between the guide elements or guide faces and an inner wall of the first line section, which flow channels extend along the first extension direction and can be separated from one another along the width and/or height of the first line section. These flow channels can, for example, effect an at least sectional guidance of the gas stream, i.e. a lateral (with respect to the first extension direction) limitation of the gas stream. This can reduce an occurrence of at least large-scale vortices in the gas stream, i.e., vortices of a magnitude exceeding the spacing of the guide elements or guide faces, i.e. the dimensioning of the flow channels transverse to the first extension direction. The flow direction of the gas stream can thus be aligned to a certain extent in the first extension direction. Furthermore, the flow channels, which are many times longer (with respect to the first extension direction) in relation to their diameter, i.e. their height and/or width, as described above with respect to the length of the first line section, can provide a sufficient streaming length for flow calming. The flow channels thus form a local cross-sectional reduction of the first line section, but without reducing the maximum cross-sectional area of the first line section. This reduction in cross-section can, for example, cause a dynamic pressure upstream of the first flow conditioning unit, which can lead to a more homogeneous distribution of the volume flow and/or a more homogeneous distribution of pressure ratios in the flow over its cross-section.

In this context, the flow channels can be completely separated from one another transverse to the first extension direction, i.e. they can be designed as closed channels in the cross-section of the first line section. Alternatively, the flow channels can also be separated from one another, i.e. closed, only in sections with respect to the cross-section and/or to the first extension direction. In other words, the flow channels can thus be in communication with each other in areas or sections thereof. The guide elements do not necessarily have to completely span or penetrate the cross-section of the first subsection along the height and/or along the width. For example, the guide elements can extend over 50%, preferably 70%, more preferably 90% of a height extent (or maximum value of the height or maximum value of the width) of the first line section or be arranged over corresponding portions of a width extent. This can, for example, provide constructional advantages with acceptable flow quality constraints. The guide faces can be straight, i.e., planar, faces. Alternatively, the guide faces can be curved and/or angled, but they are preferably substantially straight, particularly preferably exactly straight, in the first extension direction.

The first flow conditioning unit can be designed in its cross-section, i.e. perpendicular to the first extension direction, as a matrix or honeycombed, for example.

The above-mentioned number of guide elements of at least 5, preferably at least 10, further preferably at least 20, even more preferably at least 30 guide elements can, for example, be a good compromise between a sufficient increase in surface area, which can be advantageous with respect to a control of the temperature of the gas as described in more detail below, and an alignment of the flow or reduction of turbulence and minimization of the pressure loss caused by the flow resistance. Preferably, the number of flow channels corresponds to the number of columns in which gas outlet openings of the gas outlet are arranged.

Preferably, the first flow conditioning unit is connected to a temperature control device or is designed as a temperature control device, the temperature control device being configured to control the temperature of the gas that passes through the gas supply line during operation.

Temperature control can be heating as well as cooling of the gas, preferably a cooling. The first flow conditioning unit thus preferably forms a heat conducting connection between the gas and a heat sink or heat source. Such a heat sink for cooling the gas can be, for example, a cooled liquid circuit. The prerequisite for heat transfer is a temperature difference between the cooling liquid and the gas. Thus, the heat that the cooling fins or guide elements of the flow conditioning unit absorb from the passing gas is dissipated into the cooling liquid according to the heat exchanger principle. The first flow conditioning unit can, for example, be designed as a heat exchanger with cooling fins, the cooling fins forming the guide elements described above. Alternatively or in addition to a heat exchanger with cooling fins, a shell and tube heat exchanger or a lamella heat exchanger can also be provided, for example.

This makes it possible, for example, to enable temperature control or cooling of the gas without the need of introducing further flow-influencing elements into the gas stream. Due to the larger surface area of the first flow conditioning unit, e.g. compared to cooling the wall of the first line section, an improved heat transfer from the gas to the guide elements or cooling fins can be achieved. If both an effective temperature control and improved alignment of the gas stream are required, the first flow conditioning unit according to this further development can meet both requirements at the same time.

Preferably, the supply line upstream of the first flow conditioning unit and any further flow conditioning units comprises a filter device for cleaning the gas. In this way, for example, contamination of the cooling fins or the guide elements of the flow conditioning unit(s) can be prevented or at least reduced.

Preferably, the gas supply line comprises at least a second line section which adjoins the first subsection of the first line section and which extends along a second extension direction of the gas supply line that differs from the first extension direction, the second extension direction and the first extension direction further preferably enclosing an angle in the range between 45° and 135°, even more preferably an angle of at least 60°, even more preferably of at least 80° and/or even more preferably of 120° at most, even more preferably of 100° at most.

This can, for example, enable a design of the gas supply line with minimum space requirements, or the gas supply line can be better adapted to spatial conditions of the manufacturing device and/or the process chamber. Overall, by providing the first and second line sections, a sufficient streaming distance for flow calming can furthermore be achieved.

Further preferably, the second line section comprises, in addition to a wall, at least a second flow conditioning unit designed to substantially align the gas stream in the second and/or in the first extension direction, wherein the second flow conditioning unit is provided in a region of the second line section adjoining the first line section.

The wall of the second line section is understood to be in particular an inner surface of an outer boundary of the line section. The region of the second line section adjoining the first line section can in particular be a region in which the extension direction of the gas supply line changes from the second extension direction in the second line section to the first extension direction in the first line section. In particular, the second flow conditioning unit can be a flow conditioning unit in common with the first line section, that is, the first flow conditioning unit of the first line section extends into the second line section, or the first and second flow conditioning units are integrally formed.

By means of the second flow conditioning unit, it can be achieved, for example, that a guiding or conducting of the gas stream already starts before the change of direction of the gas supply line. By arranging the second flow conditioning unit in the region between the first and second line sections, i.e. in the region of the change in direction of the gas supply line, the effect of a flow conditioning unit connected to a temperature control device or designed as a temperature control device, as described above, can be further improved, for example. This is because as the turbulence of a flow increases, so does the amount of energy that can be transferred in the case of a temperature gradient between a surface and a fluid in a given period of time and for a given contact area between the surface and the fluid, i.e. the gas. The greater the change in direction of a pipe, the more the formation of vortices or turbulence of the gas flow conducted in the pipe is favored, especially in a line section directly after the change in direction.

Further preferably, a maximum value of a width of the second line section transverse to the second extension direction and parallel to the build area is substantially the same as the maximum value of the width of the first line section.

This can, for example, provide for a sufficient streaming length for the gas stream, along which streaming length at least the width of the gas supply line does not change.

Preferably, the gas supply line further comprises a third line section which connects upstream to the second line section and which has an (inner) cross-sectional area perpendicular to its extension direction which is smaller than the (inner) cross-sectional area of the second line section. This means that a cross-section of the gas supply line widens from the third line section toward the second line section. Such a widening of the cross-section can, for example, be a widening by a factor of 3, 5 or 10. A further widening of the cross-section can occur, for example, at the transition from the second line section to the first line section, i.e. a cross-sectional widening and thus slowing down of the (average) flow velocity can occur stepwise.

Alternatively or additionally, the shape of the cross-sectional area of the third line section differs from the shape of the cross-sectional area of the second line section. For example, the third line section can have a circular cross-sectional area and the second line section can have a rectangular cross-sectional area.

Overall, thus, a cross-sectional widening and/or change in the cross-sectional area already occurs at a sufficient distance from the gas inlet so that, for example, a sufficient streaming distance can be provided in a direction or at a width for flow calming. In addition, the third line section can, for example, be adapted to particular spatial conditions of the manufacturing device, i.e. be designed in a space-saving and/or cost-effective manner.

Preferably, the first line section further comprises a second subsection that adjoins the gas inlet and whose volume is substantially not divided or which comprises at least a third flow conditioning unit for aligning the gas stream in the first extension direction, the third flow conditioning unit having a length along the first extension direction of less than or equal to 5 cm, preferably less than or equal to 1 cm, and being arranged at a distance from the gas inlet.

The second subsection of the first line section adjoins the gas inlet, i.e. it is provided spatially, i.e. in the first extension direction, between the first subsection and the gas inlet. The first line section is further preferably formed entirely by the first subsection, the second subsection, and optionally a third subsection. The third subsection preferably comprises the gas inlet or is formed by a flow modification element of the gas inlet described above. Thus, in the preferred embodiment, the first, second and optionally third subsections adjoin each other without gaps, i.e. the first line section does not comprise any further (undefined) subsections.

The expression of a "substantially" not divided volume implies that, for example, production-related unevenness of the second subsection, in particular on its wall, is included.

The third flow conditioning unit can comprise, for example, a screen or a grid having, for example, openings with a honeycomb, rectangular or circular cross-section. Such a screen can be a fine mesh screen made of steel wire, for example.

The second subsection can, for example, cause a more homogeneous distribution of the volume flow and/or a more homogeneous distribution of pressure ratios in the flow across its cross-section, in particular in conjunction with a dynamic pressure that can form upstream of the gas inlet. This can, for example, improve the homogeneity of the flow entering the process chamber from the gas inlet. Furthermore, a velocity and/or pressure distribution that differs (locally), in particular in the vertical direction, can be compensated in the second subsection, which can be caused by the change in direction of the gas stream described above. Without the second subsection, the dynamic pressure caused by the gas inlet could form in the first subsection (in particular in the flow conditioning unit) or extend into the first subsection. In a second subsection, which is substantially not divided or comprises a relatively small-scale flow conditioning unit, any inhomogeneities in the local distribution of pressures and/or volume flows can be better compensated, since there are no separate sub-spaces preventing exchange processes, i.e. there is sufficient permeability between any sub-spaces. The second subsection effectively forms an increase in cross-sectional area compared to the cross-sectional area in the first subsection, which is reduced by a certain amount due to the flow conditioning unit, depending on how it is formed. This causes a reduction of the flow velocity, thereby supporting compensating tendencies of the gas volume, e.g. with respect to local differences in pressure, velocity or volume flow.

Further preferably, in the first extension direction the first subsection extends a first length section of the first line section and the second subsection extends a second length section of the first line section, wherein the first length section is larger than or equal to the second length section, preferably at least one and a half times greater, particularly preferably at least two times greater. This provides, for example, for a sufficient streaming length of the gas in the two subsections.

According to the invention, an additive manufacturing device for the production of a three-dimensional object comprises a solidification device for selectively solidifying a building material layer by layer in a build area, as well as a process chamber, a gas supply device for generating a gas stream in the additive manufacturing device, at least one gas inlet for introducing the gas stream into the process chamber and at least one gas outlet for directing the gas stream out of the process chamber, and a gas supply line provided outside the process chamber in order to conduct gas to the at least one gas inlet, the gas supply line comprising at least a first line section which adjoins the gas inlet and which extends a length along a first extension direction of the gas supply line, the first extension direction being substantially straight, wherein the first line section extends a maximum value of a width that extends transverse to the first extension direction and parallel to the build area and wherein the length of the first line section is at least as large as one half of the maximum value of the width, and wherein the first further comprises a first subsection that is arranged at a distance from the gas inlet and which comprises, in addition to a wall of the first line section, at least a first flow conditioning unit designed to substantially align the gas stream in the first extension direction.

Thus, it is possible, for example, to achieve the effects described above with respect to the flowing device also in an additive manufacturing device.

A flow method according to the invention serves to generate a gas stream in an additive manufacturing device for producing a three-dimensional object by layer-wise selective solidification of a building material in a build area, wherein the additive manufacturing device comprises a process chamber. The flow method comprises the following steps:

generating a gas stream in the additive manufacturing device by means of a gas supply device, conducting the gas stream in a gas supply line to at least one gas inlet and introducing the gas stream through the at least one gas inlet into the process chamber, wherein the gas supply line is provided outside the process chamber and wherein the gas supply line comprises at least a first line section which adjoins the gas inlet and which extends a length along a first extension direction of the gas supply line, the first extension direction being substantially straight, wherein the first line section extends a maximum value of a width that extends transverse to the first extension direction and parallel to the build area, and wherein the length of the first line section is at least as large as one half of the maximum value of the width, aligning the gas stream substantially in the first extension direction by means of at least a first flow conditioning unit provided in a first subsection of the first line section in addition to a wall of the first line section, the first subsection being arranged at a distance from the gas inlet, and directing the gas stream out of the process chamber through at least one gas outlet.

Thus, it is possible, for example, to achieve the effects described above with respect to the flow device also in a flow method.

According to the invention, a manufacturing method for the additive production of a three-dimensional object in an additive manufacturing device comprises the steps of applying a building material layer-by-layer in a build area, selectively solidifying the applied layer by means of a solidification device, and repeating the steps of layer-wise application and selective solidification until the three-dimensional object is produced, wherein the additive manufacturing device comprises a process chamber. At least temporarily during the production of the three-dimensional object the following steps are carried out:

generating a gas stream in the additive manufacturing device by means of a gas supply device, conducting the gas stream in a gas supply line to at least one gas inlet and introducing the gas stream through the at least one gas inlet into the process chamber, wherein the gas supply line is provided outside the process chamber and wherein the gas supply line comprises at least a first line section which adjoins the gas inlet and which extends a length along a first extension direction of the gas supply line, the first extension direction being substantially straight, wherein the first line section extends a maximum value of a width that extends transverse to the first extension direction and parallel to the build area, and wherein the length of the first line section is at least as great as one half of the maximum value of the width, aligning the gas stream substantially in the first extension direction by means of at least a first flow conditioning unit provided in addition to a wall of the first line section in a first subsection of the first line section, the first subsection being arranged at a distance from the gas inlet, and directing the gas stream out of the process chamber through at least one gas outlet.

This makes it possible, for example, to also achieve the effects described above with regard to the flow device in an additive manufacturing process.

BRIEF DESCRIPTION OF THE DRAWINGS

Further features and expediencies of the invention become apparent from the description of exemplary embodiments with reference to the accompanying drawings.

DETAILED DESCRIPTION OF THE EMBODIMENTS

Figure 1:
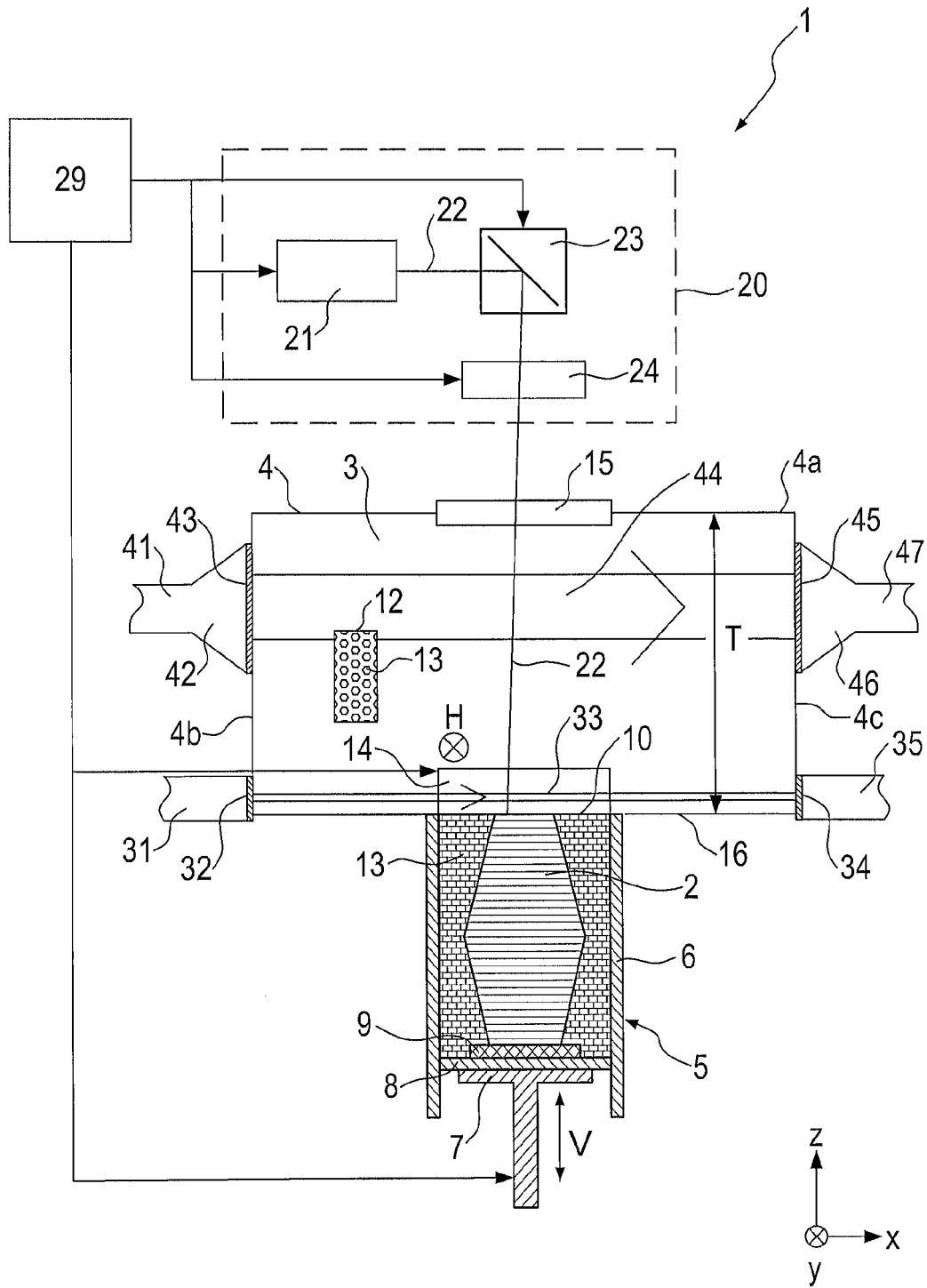
FIG. 1 shows a schematic view, partially in cross-section, of a device for the additive production of a three-dimensional object according to an embodiment of the present invention.

Hereafter, a device is described with reference to FIG. 1, in which device the present invention is applied. The device shown in FIG. 1 is a laser sintering or laser melting device 1. For building an object 2, it contains a process chamber 3 with a chamber wall 4.

A container 5 open to the top, also referred to as a building container, and comprising a container wall 6 is arranged below the process chamber 3. A support 7 that can be moved in a vertical direction V is arranged in the container 5, to which support a base plate 8 is attached which closes the container 5 to the bottom and thus forms the bottom thereof. The base plate 8 can be a plate formed separately from the support 7 and attached to the support 7, or it can be formed integrally with the support 7. Depending on the building material and process used, a building platform 9 can also be attached to the base plate 8 as a building base on which the object 2 is built. However, the object 2 can also be built on the base plate 8 itself, which then serves as the building base.

A working plane 16 is defined by the upper opening of the container 5, wherein the area of the working plane 16 located within the opening, which area can be used to build the object 2, is referred to as a build area 10. The build area 10 is thus provided between the container 5 and the process chamber 3. The working plane 16 can at the same time be the surface of a working plate, which surface faces the interior of the process chamber 3, i.e. the upper surface, the working plate not being shown in FIG. 1. The working plate, which is not shown, at the same time forms the bottom of the process chamber 3 and preferably surrounds the container 5 on all its sides. The working plane 16 is spaced by a process chamber height T from a ceiling 4a of the process chamber wall 4. The process chamber height T is also referred to as the maximum clear height of the process chamber, since a ceiling area of the process chamber 3 can have a non-uniform height level, e.g. with roof slopes.

In FIG. 1, the object 2 to be formed in the container 5 on the building platform 9 is shown below the working plane 16 in an intermediate state with several solidified layers surrounded by building material 13 that remained unsolidified.

In a first side 4b of the chamber wall 4 a lower gas inlet and optionally an upper gas inlet are provided for introducing a gas into the process chamber 3. The lower gas inlet comprises a gas intake element 32, for example in the form of a nozzle element 232 (see FIGS. 4, 5) or in the form of a gas inlet field 132 (see FIGS. 2, 3), and the optional upper gas inlet is formed as a gas inlet field 43. The gas intake element 32 can be provided in the chamber wall 4, i.e. in a plane of the chamber wall 4, or can end flush with a surface of the chamber wall 4 facing the process chamber, as shown in FIG. 1. Alternatively or additionally, as shown in FIG. 5, the gas intake element 32 can also be offset from the chamber wall 4 and set back from the chamber wall 4, or it can be offset from the chamber wall 4 and project into the interior of the process chamber 3 (not shown). This applies analogously to the optional gas inlet field 43 of the upper gas inlet.

In a second side 4c of the chamber wall 4, which is located opposite to the first side 4b, at least one gas outlet is provided for directing the gas out of the process chamber 3. In FIG. 1, two gas outlets are shown, i.e. a lower gas outlet 34 and an upper gas outlet. The upper gas outlet can also be formed as a gas outlet field 45, for example as a perforated plate. The lower gas outlet 34 is formed as an opening in the chamber wall 4, wherein a guide element or structuring element, such as a grating, can be inserted into the opening or can be located pre-facing to the opening. The gas outlets 34, 45 can also be provided in the chamber wall 4 or can be offset from the chamber wall 4 and project into the interior of the process chamber 3 or can be set back from the chamber wall 4.

The lower gas inlet or the gas intake element 32 and the lower gas outlet 34 each are arranged below the upper gas inlet field 43 and the upper gas outlet field 45, respectively, i.e. closer to the working plane 16 or the build area 10 than the upper gas inlet field 43 and the upper gas outlet field 45 in a direction perpendicular to the build area 10. The lower gas inlet or the gas intake element 32 and the lower gas outlet 34 are arranged in a lower height region of the process chamber 3, i.e. near the build area. The upper gas inlet or the upper gas inlet field 43 and the upper gas outlet or the upper gas outlet field 45 are arranged in an upper height region of the process chamber 3, i.e. near the ceiling and far from the build area. At a process chamber height T, i.e. a maximum distance T of the working plane 16 or of the build area 10 from the ceiling 4a of the process chamber 3, the gas intake element 32 of the lower gas inlet and the lower gas outlet 34 can, for example, be arranged within a region of the process chamber 3 adjacent to the build area 10, which region comprises a height extent of 20% or 10% of the process chamber height T. The optional upper gas inlet field 43 and the upper gas outlet field 45 can be arranged, for example, within a region of the process chamber 3 adjacent to the ceiling 4a of the process chamber 3, which region comprises a height extent of 60% of the process chamber height T.

In doing so, the gas intake element 32 of the lower gas inlet and the lower gas outlet 34 need not adjoin to the working plane 16, but can also be spaced therefrom. For example, the gas intake element 32 and/or the lower gas outlet 34 can be provided 2 cm or 5 cm above the working plane 16. Similarly, the optional upper gas inlet field 43 and the gas outlet field 45 need not adjoin to the ceiling 4a of the process chamber 3, but can also be spaced therefrom.

The gas inlets 32, 43 are in gas-conducting connection via a gas supply line 30 (see FIG. 2), which is provided outside the process chamber 3, and the gas outlets 34, 45 are in gas-conducting connection via a gas discharge line (not shown), which is also provided outside the process chamber 3, with a gas supply device not shown. Altogether, a gas circulation system is thus provided to direct gas into the process chamber 3 via the lower gas intake element 32 and the upper gas inlet field 43 and out of the process chamber via the gas outlets 34, 45. The gas circulation system can be configured as an approximately closed process gas circuit. FIG. 1 merely shows sections of a lower horizontal gas supply channel 31 and of an upper horizontal gas supply channel 41 of the gas supply line 30, which are in gas-conducting connection with the gas intake element 32 of the lower gas inlet and with the gas inlet field 43 of the upper gas inlet, respectively. Similarly, FIG. 1 merely shows a lower channel section 35 and an upper channel section 47 of the gas discharge line, which are in gas-conducting connection with the lower gas outlet 34 and the upper gas outlet 45, respectively. As shown in FIG. 1, a funnel-shaped inlet chamber 42 can be provided on the side of the upper gas inlet field 43 facing away from the process chamber 3, i.e. upstream of the upper gas inlet field 43. Similarly, a funnel-shaped outlet chamber 46 can be provided on the side of the upper gas outlet field 45 facing away from the process chamber 3, i.e. downstream of the upper gas outlet field 45. The inlet chamber 42 and the outlet chamber 46 are thus at least partially delimited by the upper gas inlet field 43 and the upper gas outlet field 45, respectively, and are in gas-conducting connection with the gas supply device, which is not shown, via the upper horizontal gas supply channel 41 and the upper channel section 47 of the gas discharge line, respectively. The gas supply line 30 is described in more detail below with reference to FIGS. 2 and 3.

The gas used is preferably a protective gas that substantially does not chemically react with the building material (inert gas), for example nitrogen or argon, depending on the building material used.

The laser sintering device 1 further comprises a storage container 12 for a building material in powder form 13 which can be melted, or solidified, by electromagnetic radiation, and a recoater 14 that can be moved in a horizontal direction H for applying the building material 13 within the build area 10. Preferably, the recoater 14 extends transverse to its direction of movement over the entire area to be coated. In the device 1 shown in FIG. 1, the direction H in which the recoater 14 is movable extends into the drawing plane (indicated by a circle with a cross), but it can also extend out of the drawing plane. Preferably, the recoater 14 is arranged in the device 1 to be movable in two opposite directions.

Optionally, a radiant heater not shown in FIG. 1 can be arranged in the process chamber 3, which serves to heat the applied building material 13. For example, an infrared radiator can be provided as a radiant heater.

The laser sintering device 1 further includes a solidification device in the form of an exposure device 20 with a laser 21 that generates a laser beam 22, which is deflected via a deflection device 23 and projected onto the working plane 16 by a focusing device 24, such as an F-theta lens, via a coupling window 15 provided in a ceiling 4a of the chamber wall 4 of the process chamber 3. In doing so, the laser beam impinges on the working plane 16 in a radiation impact area or an impingement point or impingement area (not shown in FIG. 1).

Furthermore, the laser sintering device 1 comprises a control unit 29, via which the individual components of the device 1 are controlled in a coordinated manner in order to implement the building process. Alternatively, the control unit can also be arranged partially or entirely outside of the device. The control unit can include a CPU whose operation is controlled by a computer program (software). The computer program can be stored separately from the device on a storage medium, from which it can be loaded into the device, in particular into the control unit.

Various types of powder can be used as a building material, in particular metal powder, plastic powders, ceramic powders, sand, filled or mixed powders. Instead of a powder, other suitable materials can also be used as a building material. Preferably, the building material is a metal powder or a metal-based powder with a metal content of greater than 50 percent by weight. When a metal powder or metal-based powder is used as the building material, the occurrence of impurities, such as splatters, fumes, vapors and/or gases is typically increased, so that particularly good improvements in the manufacturing process or in the quality and/or dimensional accuracy of the object to be produced can be achieved by the invention.

During operation of the laser sintering or laser melting device 1 shown in FIG. 1, in order to apply a powder layer, the support 7 is first lowered by an amount corresponding to the desired layer thickness. The recoater 14 first moves to the storage container 12 and receives therefrom an amount of the building material 13 sufficient for applying a layer. The storage container 12 does not need to be arranged above the working plane 16 as shown in FIG. 1, but it can also be arranged below the working plane and can be designed, for example, as a metering piston that supplies a specific amount of the building material 13 to the recoater 14 each time. The recoater 14 then moves across the build area 10, there applies building material 13 in powder form to the building base or to a previously existing powder layer and spreads it into a powder layer. The application is carried out at least across the entire cross-section of the object 2 to be produced, preferably across the entire build area 10, i.e. the area delimited by the container wall 6. Optionally, the building material 13 in powder form is heated to a working temperature by means of a radiant heater (not shown).

Subsequently, the cross-section of the object 2 to be produced is scanned by the laser beam 22, so that the building material 13 in powder form is solidified at locations that correspond to the cross-section of the object 2 to be produced. In this process, the powder grains are partially or completely melted at these locations by means of the energy introduced by the radiation so that, after cooling, they are present joined together as a solid body. These steps are repeated until the object 2 is completed and can be removed from the process chamber 3.

During the layer-wise production of the object 2, a gas is at least temporarily introduced into the process chamber 3 by the gas supply device, which is not shown, through the gas supply line 30, respectively its lower horizontal gas supply channel 31 and the gas intake element 32, and is directed or sucked out of the process chamber 3 again through the lower gas outlet 34 and the lower channel section 35 of the gas discharge line, so that a lower gas stream 33 is generated in the process chamber 3, which flows above the working plane 16 at least along the build area 10. Optionally, gas is further introduced into the process chamber 3 through the gas supply line 30 or an upper horizontal gas supply channel 41 connected thereto and the upper gas inlet field 43, and is again directed or sucked out of the process chamber 3 through the upper gas outlet field 45 and the upper channel section 47 of the gas discharge line, so that an upper gas stream 44 is generated in the process chamber 3, which flows through the process chamber 3 above the lower gas stream 33. In doing so, it is also possible for the lower gas stream 33 and the upper partial stream 44 to mix at least partially, i.e. for partial gas streams to flow through the intermediate region between the lower gas stream 33 and the upper gas stream 44 (not shown).

Due to the main flow direction of the lower gas stream 33 and the upper gas stream 44 from the gas intake element 32 to the lower gas outlet 34 and from the upper gas inlet field 43 to the upper gas outlet field 45, i.e. from the first side 4b to the opposite second side 4c, and/or by a mean inflow direction in which partial streams of the gas substantially enter the process chamber 3 through the gas intake element 32 or the upper gas inlet field 43, an x-direction is defined that extends parallel to the build area 10 and the working plane 16. The build area 10 and the working plane 16 define an x-y plane of a Cartesian coordinate system, the y-direction corresponding to the direction of movement H of the recoater 14 in the device shown in FIG. 1. The process chamber height T defines the z-direction of the Cartesian coordinate system.

Hereinafter, the gas supply line 30 is described in more detail with reference to FIG. 2 and FIG. 3. Here, FIG. 3 shows a schematic view of the gas supply line 30 in cross-section in a plane of the lower horizontal gas supply channel 31 and of an area of the working plane 16 bounded by the chamber wall 4 from above with the recoater 14 that can be moved in the direction H. The build area 10 shown in FIG. 3 has a rectangular shape with a width M as the maximum dimension of the build area 10 in a direction parallel to the width B of the first line section 31, the width M being parallel to the direction of movement H of the recoater 14, i.e. in the y-direction. In addition, the build area 10 here has a length N in the x-direction. However, it can in principle also have another shape, such as a circular shape or any other shape. In this case, the width M of the build area is denoted as its maximum dimension or extension in the y-direction, and the length N as its maximum dimension or extension in the x-direction.

Figure 2:
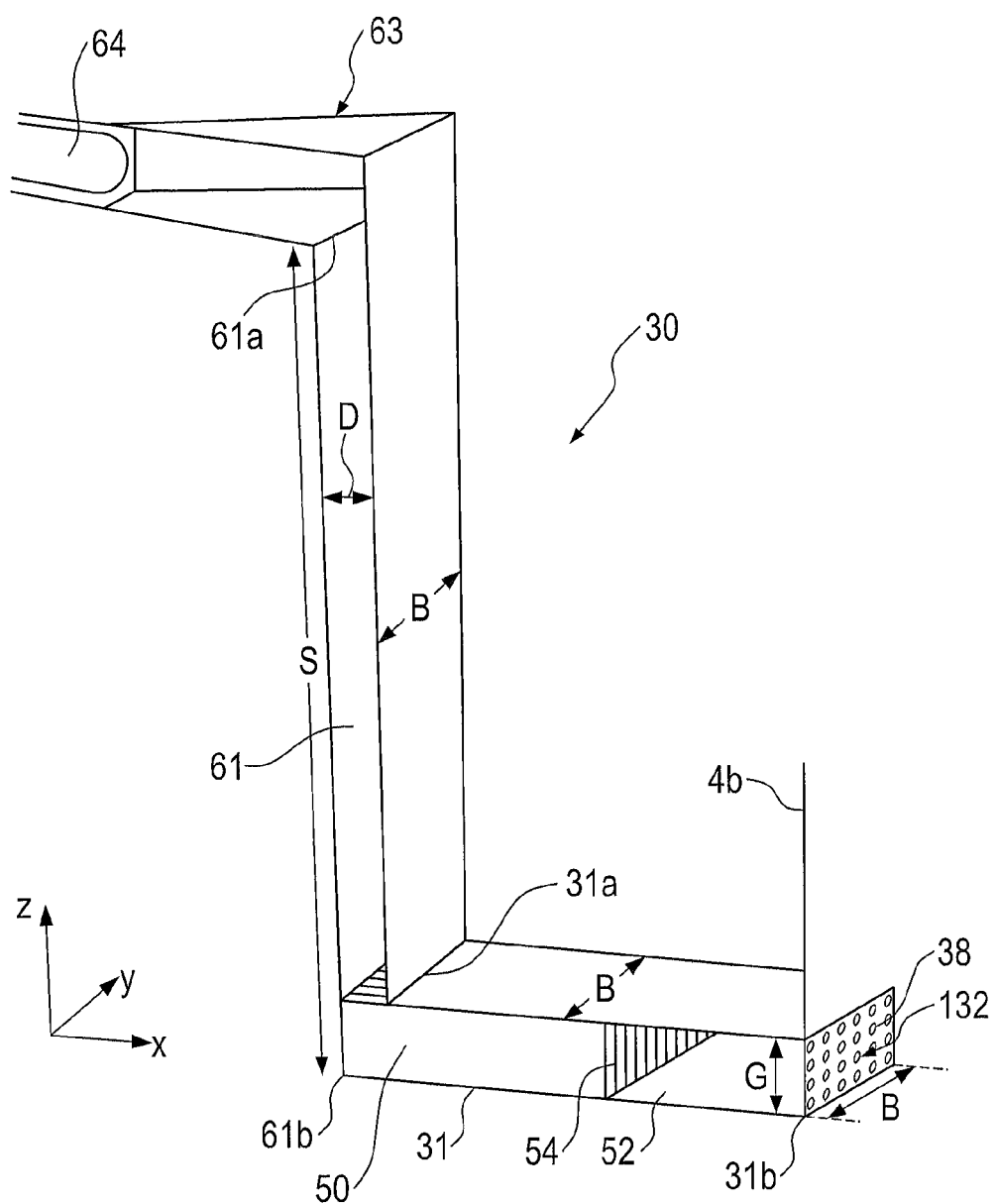
FIG. 2 shows a schematic perspective view, partially in cross-section, of a section of a gas supply line of the device, shown only partially in FIG. 1, with a gas intake element in the form of a gas inlet field.
Figure 3:
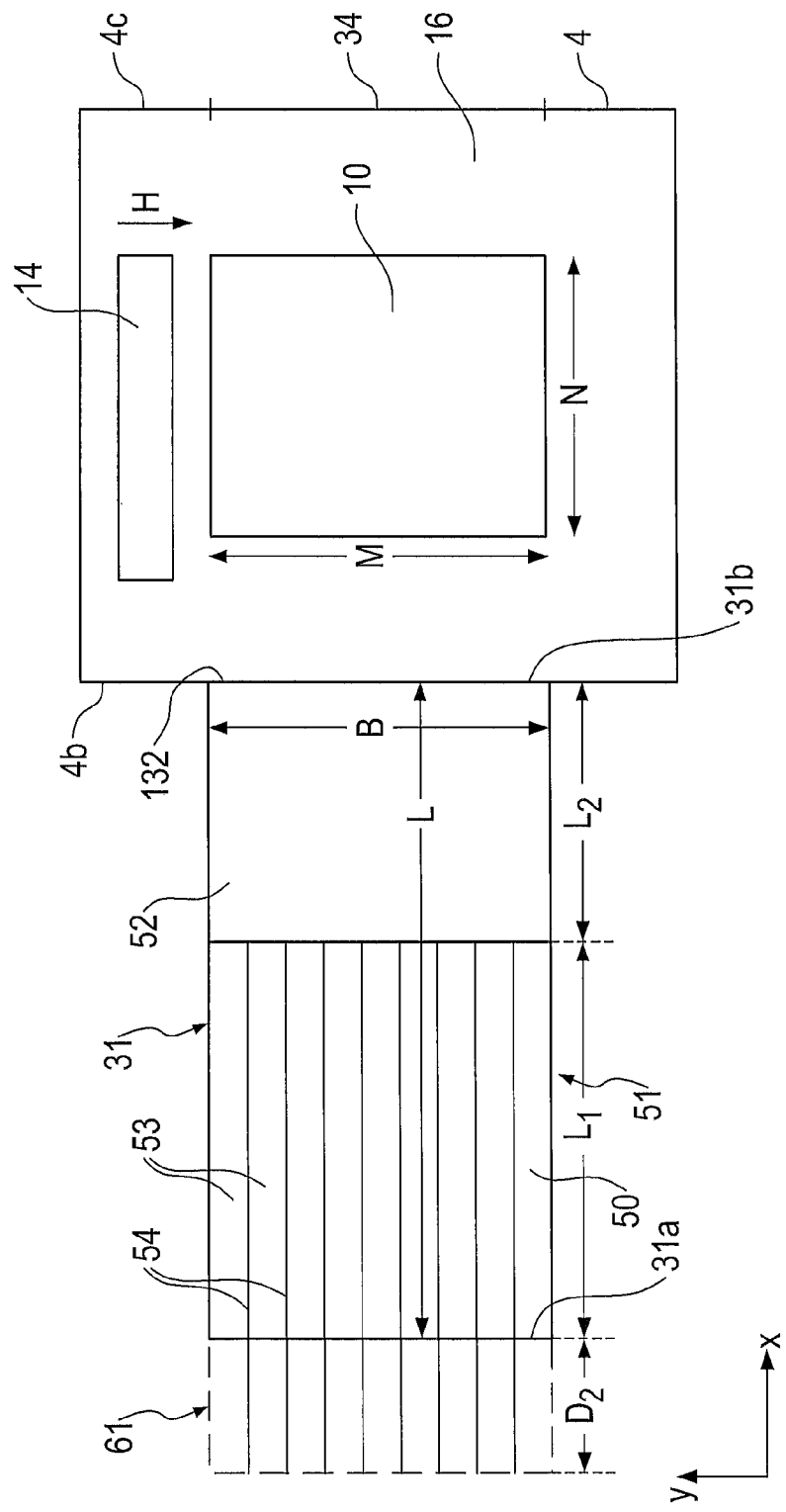
FIG. 3 shows a schematic view of a section of the device shown in FIGS. 1 and 2 with a gas intake element in the form of a gas inlet field in a top view of the working plane.

As can be seen from FIG. 2, the lower gas inlet field 132 is designed as a perforated plate with a plurality of gas inlet openings 38 spaced apart from one another, through which openings the gas flows into the process chamber 3 in the form of partial gas inlet streams (not shown) during operation of the gas supply device. Similarly, the optional upper gas inlet field 43 (see FIG. 1, not shown in FIG. 2) is designed as a perforated plate with a plurality of gas inlet openings spaced apart from one another, through which openings the gas flows into the process chamber 3 in the form of partial gas inlet streams (not shown) during operation of the gas supply device. The gas inlet openings 38 are preferably arranged in a grid pattern, i.e. regularly spaced apart from each other and side by side and one below the other, in rows and columns of the lower gas inlet field 132 and the upper gas inlet field 43, respectively. The gas inlet openings 38 of the lower gas inlet field 132 preferably have an identical geometric shape each, such as a circular or square cross-section and/or have identical areas. This preferably also applies to the gas inlet openings of the upper gas inlet field 43.

In doing so, gas can pass through the gas inlet field 132, 43 only through the gas inlet openings 38 during operation of the gas supply device. Thus, the gas inlet field 132, 43 forms a flow resistance for the gas stream so that a gas accumulation forms upstream of the gas inlet field 132, 43 causing a pressure gradient in a region upstream of the gas inlet field 132, 43 as compared to a region downstream of the gas inlet field 132, 43. The flow resistance ensures that any inhomogeneity in the local distribution of pressures of the gas stream upstream of the gas inlet field 132, 43 is reduced and preferably substantially eliminated. Thus, a uniformity of the gas inlet partial streams entering through the gas inlet openings 38 with respect to their flow velocity and/or volumetric flow rate and a uniformity of the flow properties of the gas streams 33, 44 passing through the process chamber can be achieved.

The gas supply line 30 shown in FIG. 2 comprises a tubular section 64 as a third line section, to which gas is supplied by the gas supply device not shown and which has a substantially circular or oval cross-section. Here, the tubular line section 64 is arranged substantially horizontally, i.e., parallel to the build area 10, i.e., parallel to the x-y plane. The gas supply line 30 further comprises a vertical section 61 as a second line section extending perpendicular to the build area 10, i.e. in the z-direction, from an upper end 61a to a lower end 61b along a length S. Perpendicular to its longitudinal extension, i.e. in a cross-sectional plane parallel to the x-y plane, the vertical section 61 has a rectangular cross-section. At the same time a width B of the vertical section 61 in the y-direction is preferably constant along its entire length S. Preferably, the thickness D of the vertical section in the x-direction is also constant along its entire length S. An area of the cross-section of the vertical section 61 is several times larger than an area of the cross-section of the tubular section 64, for example by a factor of 3, 5 or 10. The vertical section 61 is connected at its upper end 61a to the tubular section 64 by a transition section 63, the transition section 63 being designed to effect both the change of direction and the widening of the gas flowing through the gas supply line 30 from the horizontal tubular section 64 to the vertical section 61 during operation of the gas supply device. In addition, the transition section 63 causes the transition from the circular cross-section of the tubular section 64 to the rectangular cross-section of the vertical section 61. The increase in cross-sectional area in the transition section 63, that is, at the transition from the tubular section 64 to the vertical section 61, causes a corresponding slowing of the flow velocity of the gas.

At the lower end 61b of the vertical section 61 as the second line section, a lower horizontal gas supply channel 31 as a first line section connects to the vertical section 61. The lower horizontal gas supply channel 31 extends from a first end 31a to a second end 31b horizontally, i.e. parallel to the build area 10, and preferably in the x-direction, in a longitudinal direction along a length L (see FIG. 3). The lower horizontal gas supply channel 31 has a rectangular cross-section perpendicular to the longitudinal direction, i.e. parallel to the y-z plane, which cross-section is constant along the entire length L of the lower horizontal gas supply channel 31. The cross-section has a width B in the y-direction whose length extension in FIG. 3 corresponds to the maximum value of the width. The cross-section has a height G in the z-direction. In FIG. 3, the width B of the lower horizontal gas supply channel 31 corresponds to the width M of the build area 10. Furthermore, the width B of the vertical section 61 also corresponds to the width B of the lower horizontal gas supply channel 31, i.e. to the width M of the build area 10. Thus, the cross-sectional widening in the y-direction, i.e. the widening of the cross-section width, from the tubular section 64 up to the width of the build area 10 or to a possibly even larger dimension, takes place at a comparatively large distance before the build area 10, i.e. already at the transition from the tubular section 64 to the vertical section 61. Thus, turbulences arising in the course of the widening can be at least partially reduced or calmed down by the long advance distance. This can contribute to a reduction of in particular comparatively large-scale turbulence in the lower gas stream 33 guided across the build area 10 (see FIG. 1).

The lower horizontal gas supply channel 31 connects at its second end 31b to the process chamber wall 4 without a gap, and opens into the process chamber 3 with an opening that forms the lower gas inlet and in which opening the lower gas inlet field 132 is provided (considering FIGS. 1 to 3 together). Preferably, the height G of the lower horizontal gas supply channel 31 substantially corresponds to the height of a column of gas inlet openings 38 of the lower gas inlet field 132 or to a height of the lower gas inlet.

The length L of the lower horizontal gas supply channel 31 is at least as large as half of its width B, preferably the length L is at least as large as the width B, further preferably the length L is 1.5 times, even more preferably 2 times the width B of the lower horizontal gas supply channel 31. The height G of the lower horizontal gas supply channel 31 is preferably smaller than the width B of the lower horizontal gas supply channel. For example, the lower horizontal gas supply channel 31 can have a length L of 80 cm, a width B of 40 cm and a height G of 10 cm. The length S of the vertical section 61 can be 80 cm, for example. The thickness D of the vertical section can be, for example, 5 cm.

In tests, the inventors have found out that a lower horizontal gas supply channel 31 with such dimensions provides for a sufficient streaming length for the gas flowing therethrough during operation, in which streaming length the gas stream undergoes substantially no changes in its direction or cross-section due to the channel or the dimensions of its inner wall. This leads to a calming of the gas stream and to more homogeneous flow properties.

Due to the constant width B of the gas supply line 30 at least after the transition section 63, i.e. along the first and second line sections, the gas stream adjusts early on, i.e. when flowing through the vertical section 61, to the width B of the gas stream 33 entering the process chamber from the gas inlet field 132, as described above. Thus, a long streaming distance is provided along which the gas stream is substantially unchanged, at least in its width B.

The optional upper gas supply channel 41 shown in FIG. 1 (not shown in FIG. 2) can also be in gas conductive connection with the gas supply line 30 shown in FIG. 2, for example, via an opening in the vertical section 61.

With reference to FIG. 3, the lower horizontal gas supply channel 31 comprises a first subsection 51 in which a flow conditioning unit 50 is provided as a first flow conditioning unit, and a second subsection 52. The second subsection 52 is formed by an empty or hollow, non-divided space, i.e. it does not comprise a flow conditioning unit. The first subsection 51 extends in the longitudinal direction of the lower horizontal gas supply channel 31, i.e. in the x-direction, along a first length $L_1$ and the second subsection 52 along a second length $L_2$. Preferably, the lower horizontal gas supply channel 31 is completely formed by the first subsection 51 and the second subsection 52. The first length $L_1$ of the first subsection 51 can be, for example, 60% of the total length L of the lower horizontal gas supply channel 31, and the second length $L_2$ of the second subsection 52 can be, for example, 40% of the total length L. The first subsection 51 is provided upstream of, i.e. in the intended movement direction of the gas before the second section 52. Thus, the first subsection 51 forms the part of the lower horizontal gas supply channel 31 adjacent to the vertical section 61, and the second subsection 52 forms the part of the lower horizontal gas supply channel 31 adjacent to the process chamber 3.

In this example, the flow conditioning unit 50 is formed by a plurality of guide fins 54 as guide elements, preferably the flow conditioning unit 50 comprises at least 5, further preferably at least 10, even more preferably at least 20, even more preferably at least 30 guide fins 54. The guide fins 54 are formed separately from the wall of the first subsection 51. In the example shown in FIGS. 2, 3 and 5, they each are uniformly thin plates with a preferably flat surface, the surfaces of the guide fins 54 facing the gas flowing through during operation also being referred to as guide faces (not shown in FIGS. 2, 3 and 5). The guide fins 54 extend at least along the first length $L_1$ of the first subsection 51 in the x-direction and along all of or a majority of the height G of the lower horizontal gas supply channel 31 in the z-direction. They have a comparatively small thickness (extension in the y-direction) perpendicular to their longitudinal extension in the x-direction and perpendicular to their height extension in the z-direction, i.e. in the y-direction. Thus, the guide fins 54 are oriented in the longitudinal direction of the lower horizontal gas supply channel 31, i.e. in the first extension direction. They are arranged at a distance from one another in the y-direction, i.e. along the width B of the lower horizontal gas supply channel 31, preferably regularly spaced apart. A mean distance between adjacent guide fins 54 can be, for example, 5, 10 or 20 mm. The guide fins 54 thus horizontally divide the lower horizontal gas supply channel 31 in the first subsection 51, i.e. in the y-direction, into a plurality of flow channels 53 that extend parallel to one another along the longitudinal direction (x-direction) of the lower horizontal gas supply channel 31. The flow conditioning unit 50 or the guide fins 54 can be provided integrally with the first subsection 51 or can be removably provided in the first subsection 51.

Preferably, the flow conditioning unit 50 extends into the vertical section 61 of the gas supply line 30, as shown in FIGS. 2 and 3. In this case, the guide fins 54 are longer than the length $L_1$ of the first subsection 51, preferably longer by the thickness D of the vertical section 61 than the length $L_1$ of the first subsection 51. Thus, as shown in FIGS. 2 and 3, the guide fins 54 extend along the entire lowermost section of the vertical section 61, i.e. up to its inner wall. In FIG. 3, the vertical section 61 of the gas supply line 30 is schematically depicted by a dashed line.

The guide fins 54 of the flow conditioning unit 50 serve to partition the gas stream flowing through the gas supply line 30 during operation of the gas supply device, without changing the overall width B of the flow. The guide fins 54 can prevent or reduce large-scale vortices in the gas stream at least in the horizontal direction. At least vortices in the gas stream can be limited to the extension of the intervals, i.e. flow channels 53 between the guide fins 54. Such vortices can be generated or enhanced by the change in direction of the gas supply line 30 from the vertical section 61 to the lower horizontal gas supply channel 31. Since the flow channels 53 in the present exemplary embodiment are not subdivided in the vertical direction, but extend over the entire height G of the lower horizontal gas supply channel 31, vertical compensating movements of the gas stream are permitted within each individual flow channel 53. These compensating movements with a vertical directional component can compensate or at least reduce vertical local velocity and pressure differences within each individual flow channel 53 caused by the change in direction of the flow in the transition from the vertical section 61 to the lower horizontal gas supply channel 31.

The second subsection 52, which is provided downstream of the flow conditioning unit 50, serves for a further homogenization of the gas stream exiting the flow conditioning unit 50, in particular to homogenize any spatial velocity and/or pressure differences that can be present. It proves to be advantageous in particular in view of the accumulation of gas following downstream in front of the lower gas inlet field 132 (see above). For this purpose, the second subsection 52 can comprise, as an alternative to the above-described embodiment as an empty space, a further structuring element as a third flow conditioning unit, which is designed, for example, as a screen or a grid (not shown in the figures). Such a screen or grid can, for example, have openings with a honeycomb, rectangular or circular cross-section and be, for example, a fine-mesh screen made of steel wire. The screen or grid extends in the x-direction, i.e. along the length L of the lower horizontal gas supply channel 31, for a length of a few centimeters, preferably less than or equal to 5 cm, more preferably less than or equal to 1 cm, and is provided in the second subsection 52 at a distance from the gas inlet field 132 and the guide fins 54 as the flow conditioning unit 50. Such a structuring element can lead to a further limitation of the extension of vortices in a direction transverse to the first extension direction and thus cause an improved layering or laminarization of the gas stream shortly before its entry into the process chamber 3.

Preferably, the guide fins 54 of the flow conditioning unit 50 of the upper horizontal gas supply channel 31 are configured as a temperature control device (not shown) for heating and/or cooling the gas flowing through, in particular as a cooling device for cooling the gas. The guide fins 54 in this case are also referred to as cooling fins. Further preferably, the guide fins 54 are configured as a heat exchanger. For this purpose, the guide fins 54 can, for example, be in contact with a heat source (for heating the gas) or a heat sink (for cooling the gas). For example, the guide fins 54 can be connected to a liquid cooling system such as an oil or water cooling system.

Preferably, a temperature sensor is further provided in the gas stream flowing through the supply line 30 and/or in a temperature control circuit, in particular a cooling circuit, which temperature sensor serves to monitor the thermal energy exchange to or from the gas and is optionally connected to an adjustment device for adjusting the thermal energy exchange.

The temperature control device enables a temperature control of the gas, i.e. the gas to be heated and/or cooled, before it flows into the process chamber 3. For heating and/or cooling the gas no further elements, which can possibly affect the flow, are required in the gas stream, since the flow aligning guide fins 54 are used as the temperature control device. Due to the large total surface area of the guide fins, e.g. compared to an alternatively possible temperature-control of the smaller-surface inner pipe wall, an improved heat transfer, i.e. a larger exchange of thermal energy per unit of time, between the gas and the guide fins 54 is achieved. Since the guide fins 54 are provided in an area of the supply line 30 in which vortices form in the gas stream due to the right-angled directional deflection from the vertical section 61 to the horizontal gas supply channel 31, the cooling or heating effect of the temperature-controlled guide fins 54 is greater here than in a section of the supply line 30 in which the gas stream is deliberately guided in such a way that turbulence is reduced.

In addition, a filter for depositing impurities can be provided in a section of the supply line upstream of the flow conditioning unit 50 or flow conditioning units, for example in the tubular section 64. In this way, contamination of the guide fins 54, for example with condensate, can be prevented or at least considerably reduced.

Figure 4:
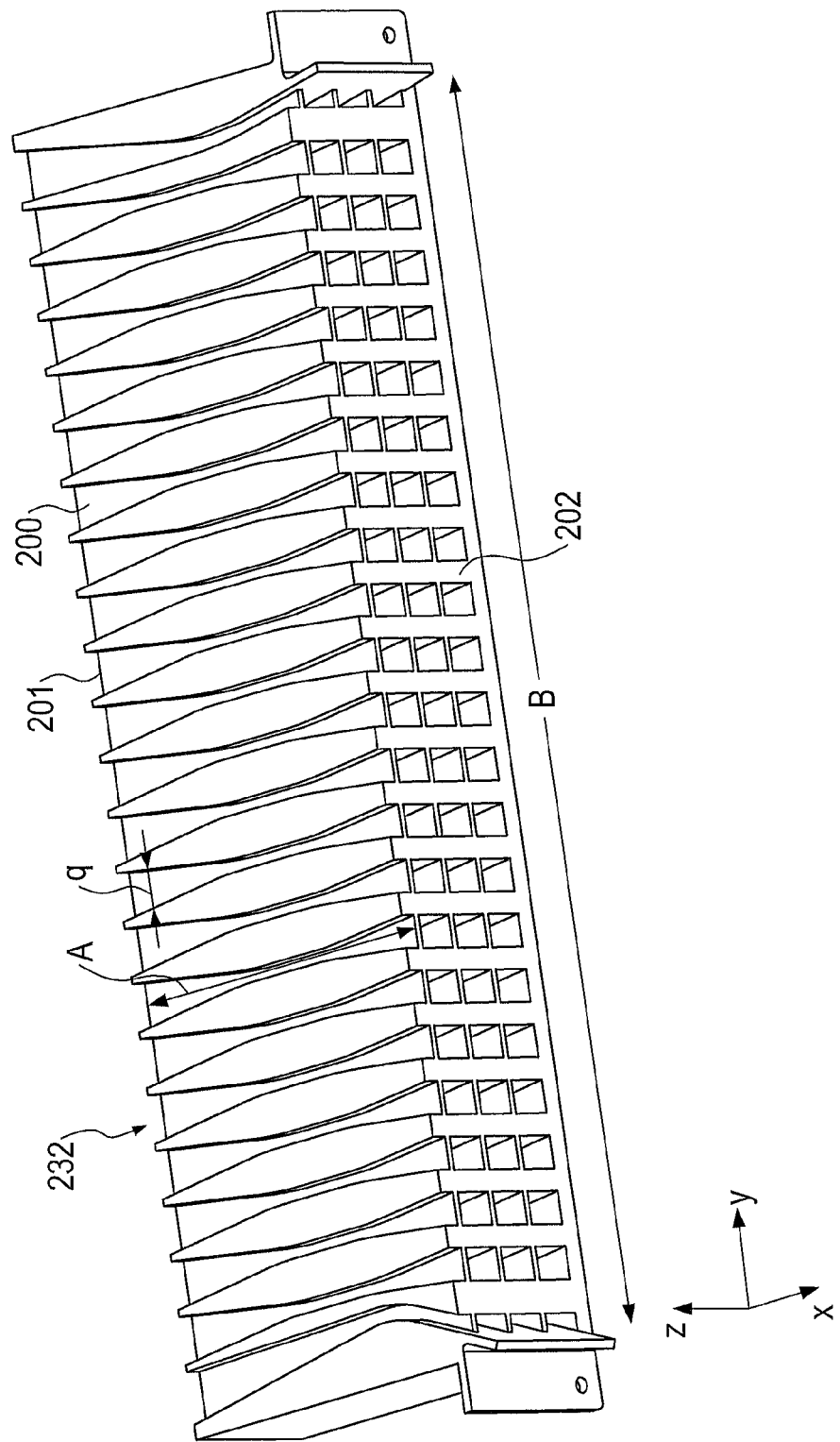
FIG. 4 shows a schematic view of a gas intake element in the form of a nozzle element for use in the device shown in FIG. 1.
Figure 5:
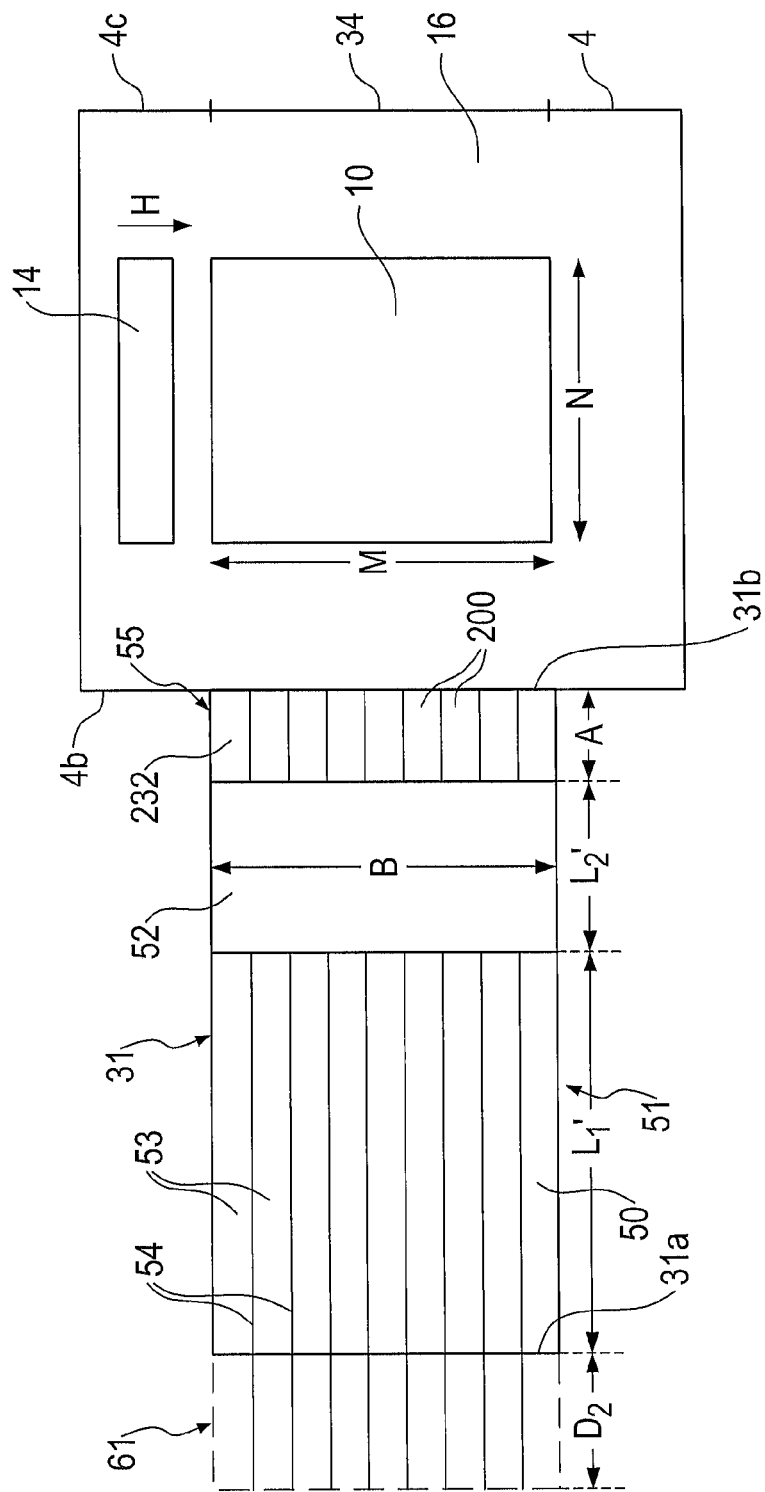
FIG. 5 shows a schematic view of a section of the device shown in FIG. 1 in a top view of the working plane applying the nozzle element shown in FIG. 4.

FIG. 4 schematically shows a gas intake element 32 (see FIG. 1) which, according to a second embodiment of the invention, serves to introduce the gas into the process chamber 3 instead of the gas inlet field 132 shown in FIGS. 2 and 3. The gas intake element shown in FIG. 4 is a nozzle element 232. It comprises a plurality of gas inlet channels 200 for introducing the gas into the process chamber 3.

The nozzle element 232 is formed of a body of a solid material, which is penetrated by the gas inlet channels 200 from a gas inlet side 201 to a gas outlet side 202. The gas inlet channels 200 are delimited on all sides by walls and, during operation of the nozzle element 232, form the only gas-permeable connection from the gas inlet side 201 through the nozzle element 232 to the gas outlet side 202. The gas inlet channels 200 extend in an extension direction along a distance A, wherein the extension direction of the gas inlet channels 200 corresponds to the flow direction of the gas through the nozzle element 232 from the gas inlet side 201 to the gas outlet side 202, i.e. the x-direction.

Preferably, as shown in FIG. 4, the gas inlet channels 200 are arranged side by side and one below the other and regularly spaced from each other in rows and columns in the nozzle element 232 with respect to the y-z plane. In this regard, the rows of gas inlet channels 200 are preferably arranged parallel to the build area 10 in the mounted state of the nozzle element 232. The rows and/or columns can also be offset from each other (not shown in FIG. 4). For example, the gas inlet channels 20 can be arranged in five rows and 21 columns in the nozzle element 232.

A row of gas inlet channels 200 preferably extends substantially over the width B of the lower horizontal gas supply channel 31 in the y-direction, and a column of gas inlet channels 200 preferably extends substantially over the height $G_1$ of the lower horizontal gas supply channel 31 in the z-direction when the nozzle element 232 is mounted in the side wall 4b of the process chamber 3 or in the lower horizontal gas supply channel 31.

The gas inlet channels 200 each have a channel cross-sectional area in the y-z plane, i.e. perpendicular to their extension direction, denoted by the opening diameter q in the y-direction in FIG. 4. In the exemplary embodiment of FIG. 4, the channel cross-sectional area has a square or rectangular shape and varies along the extension direction, i.e. the distance A, of the gas inlet channels 200 at least in sections thereof, i.e. it is not constant. In FIG. 4, the opening diameter q decreases in a first section of the gas inlet channels 200 from the gas inlet side 201 of the nozzle element 232 toward the gas outlet side 202, and in a subsequent second (middle) section of the gas inlet channels 200, the opening diameter q is substantially constant. In a subsequent third section extending up to the gas outlet side 202, the opening diameter q increases towards the gas outlet side 202. Thus, from the gas inlet side 201 to the gas outlet side 202, i.e. in the flow direction of the gas, the gas inlet channels 200 first comprise a convergent section, i.e. a section designed as a nozzle or convergent nozzle, then a substantially constant section and subsequently a divergent section, i.e. a section designed as a diffusor. The cross-sectional variation along the distance A, i.e. the extension direction of the gas inlet channels 200, need not be realized in the y-direction as shown in FIG. 4. Alternatively or additionally, the cross-sectional variation can also be realized in the z-direction.

A gradient of the cross-sectional variation, i.e. the cross-sectional decrease in the first section and the cross-sectional increase in the third section of the gas inlet channels 200, is preferably continuous, i.e. the opening diameter q changes continuously along the distance A in the mathematical sense, further preferably smoothly in the mathematical sense. Alternatively, the cross-sectional variation can also be stepwise.

It should be noted that the nozzle element 232 is not limited to embodiment shown herein, rather the geometric shape and/or arrangement of the gas passage channels 200 in the nozzle element 232 can differ from the embodiment of the nozzle element 232 shown in FIG. 4. For example, the gas passage channels can have a constant channel cross-sectional area along the distance A or can be formed with only two of the three sections described above. Also, the gas passage channels can be designed at least partially deviating from one another in their geometric shape.

FIG. 5 shows, analogously to FIG. 3, a schematic view of the gas supply line 30 in cross-section in a plane of the lower horizontal gas supply channel 31 and of an area of the working plane 16 bounded by the chamber wall 4 from above, wherein instead of the gas inlet field 132 shown in FIGS. 2 and 3 the nozzle element 232 described with reference to FIG. 4 is provided as the gas intake element of the lower gas inlet. Therefore, only features and effects in which the arrangement shown in FIG. 5 differs from the arrangement shown in FIG. 3 are given below. In FIG. 5, the gas inlet channels 200 are shown only schematically as rectangular channels with a constant channel cross-sectional area along the distance A.

In FIG. 5, the lower horizontal gas supply channel 31 is formed by the first subsection 51, which comprises the flow conditioning unit 50, the second subsection 52, which is formed by an empty space (see FIG. 3) or comprises a screen or a grid as a further flow conditioning unit (see above), and a third subsection 55, in which the nozzle element 232 is arranged. Therein, the second subsection 52 is provided in the longitudinal direction of the lower horizontal gas supply channel 31, i.e. in the x-direction, between the first subsection 51 and the third subsection 55. The nozzle element 232 extends the distance A along the longitudinal direction of the lower horizontal gas supply channel 31, i.e. in the x-direction, from its gas inlet side 201 facing the second subsection 52 to its gas outlet side 202 facing the interior of the process chamber 3, i.e. the third subsection 55 has a third length corresponding to the distance A of the nozzle element 232. The first subsection 51 extends in the longitudinal direction of the lower horizontal gas supply channel 31, i.e. in the x-direction, along a first length $L_1'$, which can correspond, for example, to the first length $L_1$ of the first subsection in FIG. 3, and the second subsection 52 extends along a second length $L_2'$, which can be smaller than the second length $L_2$ of the second subsection in FIG. 3 by the distance A, for example. The distance A can be, for example, 10 cm, so that the second subsection 52 has a length $L_2'$ of 20 cm when the total length L of the lower horizontal gas supply channel 31 is 80 cm and the length $L_1'$ of the first subsection 51 is 50 cm.

Alternatively to the arrangement of the nozzle element 232 in the lower horizontal gas supply channel 31 shown in FIG. 5, where the gas outlet side 202 of the nozzle element 232 is provided substantially flush with an adjacent surface of the inner wall of the process chamber wall 4, the nozzle element 232 can also project partially or completely into the interior of the process chamber 3.

Figure 6:
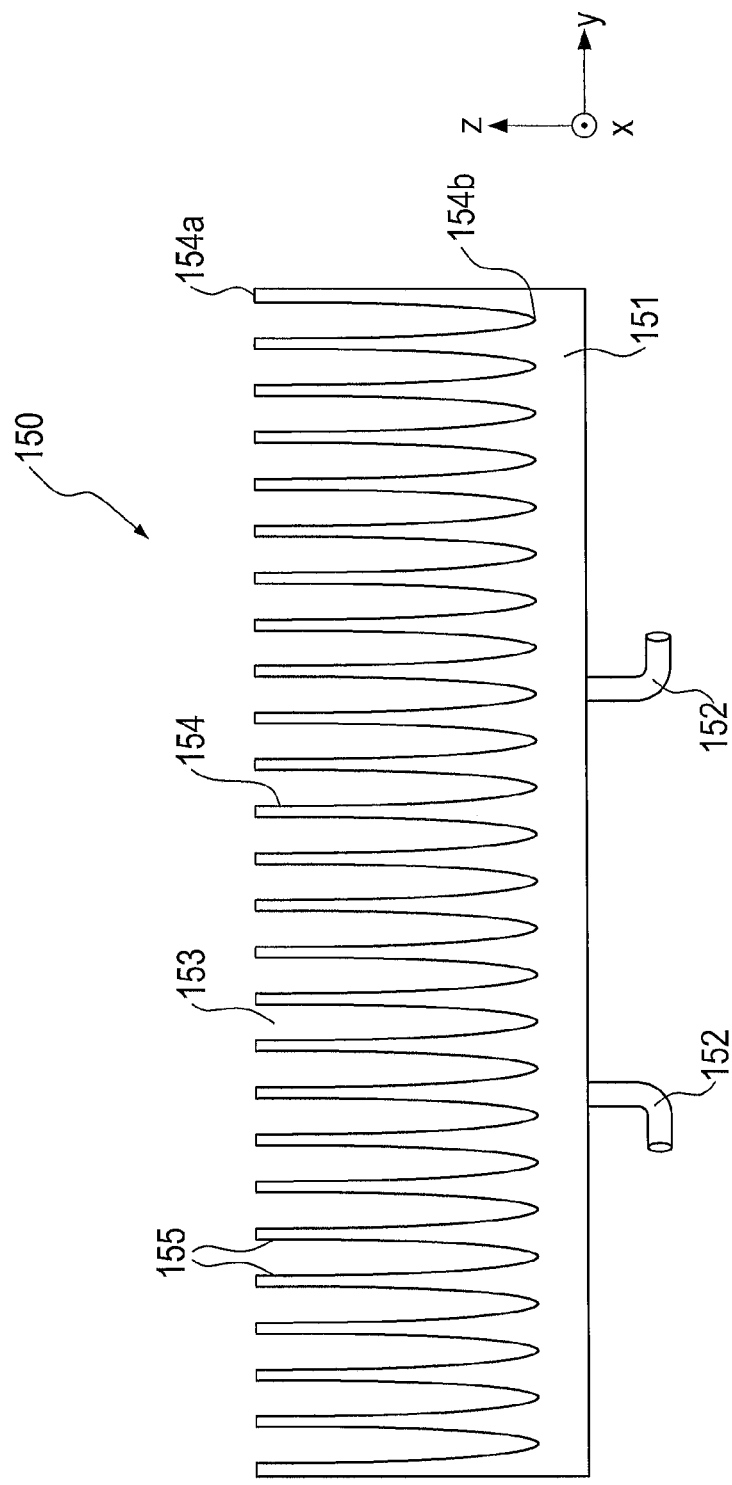
FIG. 6 shows a schematic view of a further development of the flow conditioning unit shown schematically in FIGS. 2, 3 and 5.

FIG. 6 schematically shows a view in cross-section of a flow conditioning unit 150 according to a first further development with guide fins 154 provided on a base plate 151. The base plate 151 can, for example, at the same time comprise or form a lower wall of the lower horizontal gas supply channel 31.

The flow conditioning unit 150 shown in FIG. 6 differs from the flow conditioning unit 50 shown in FIGS. 2, 3 and 5 substantially in the shape of the guide fins 154. The guide fins 154 of the flow conditioning unit 150 each extend at least over the first length $L_1$ or $L_1'$ of the first subsection 51 in the x-direction and, in a total height of the guide fins 154 with the base plate 151, over the total or a majority of the height G of the lower horizontal gas supply channel 31 in the z-direction (see FIGS. 3, 5). In the y-z plane, i.e., perpendicular to the longitudinal extension, the guide fins 154 each extend from an upper end 154a to a lower end 154b which is attached to or provided integrally with the base plate 151. The guide fins 154 have a cross-section that tapers upwardly, i.e., from the lower end 154b towards the upper end 154a. That is, perpendicular to their longitudinal extension in the x-direction and perpendicular to their height extension in the z-direction, i.e., in the y-direction, the guide fins 154 have a thickness (extension in the y-direction) that decreases from the bottom to the top. In the cross-section in the y-z plane shown in FIG. 6, the guide fins 154 can, for example, each be trapezoidal or triangular profiles, e.g. extruded profiles. They can, for example, be combined in modules. The guide fins 154 are preferably arranged along the entire width B of the first subsection 51 (i.e. in the y-direction).

The guide fins 154 are arranged spaced apart from one another in the y-direction, i.e. along the width B of the first subsection 51, preferably regularly spaced apart, wherein a distance between adjacent guide fins can be a maximum distance (i.e. determined at the upper end 154a) or an average spacing, e.g. as an averaged distance or in a central region of the guide fins 154. The guide fins 154 thus horizontally divide the lower gas supply channel 31 in the first subsection 51, i.e. in the y-direction, into a plurality of flow channels 153 that extend parallel to each other along the longitudinal direction (x-direction) of the lower horizontal gas supply channel 31. Furthermore, FIG. 6 shows guide faces 155 of the guide fins 154, which guide faces are formed as surfaces of the guide fins 154 facing the flow channels 153 and the gas flowing therethrough during operation.

The base plate 151 preferably extends substantially in the x-direction along the length $L_1$ or $L_1'$ and in the y-direction along the width B of the first subsection 51. Temperature control channels, in particular cooling channels (not shown), can optionally be provided in the base plate 151. During operation of the temperature control device, a fluid medium that is cool or warm relative to the gas temperature is fed to the temperature control channels through temperature control agent inlets and temperature control agent outlets schematically shown in FIG. 6, in particular coolant inlets and outlets 152, in order to configure the flow conditioning unit 150 or the guide fins 154 as a temperature control device for heating and/or cooling the gas flowing through, in particular as a cooling device for cooling the gas, as described above.

According to a second further development not shown, the flow conditioning unit 50, 150 comprises, in addition to the guide fins 54, 154 described above, which are oriented vertically and in the longitudinal direction of the lower horizontal gas supply channel 31, i.e. in the x-direction, a number of second guide fins which are oriented horizontally and in the longitudinal direction of the lower horizontal gas supply channel 31, i.e. in the x-direction. The second guide fins are preferably arranged parallel to one another and arranged at a distance from one another in the z-direction and preferably extend in the y-direction along the entire width B of the lower horizontal gas supply channel 31. According to the further development, the guide fins of the flow conditioning unit thus form a plurality of flow channels which extend parallel to each other along the longitudinal direction (x-direction) of the lower horizontal gas supply channel 31 and divide it both horizontally and vertically in the first subsection 51. The flow channels can be arranged relative to one another in such a way that they penetrate the lower horizontal gas supply channel 31 in the first subsection 51 in the form of a matrix of rows and columns. In this way, vortices occurring in the gas stream can also be limited in the vertical direction (z-direction) to a smaller dimension than the maximum value of the height G of the horizontal gas supply channel 31.

With such a matrix-shaped arrangement of the flow channels of the flow conditioning unit, it preferably does not extend into the vertical section 61 of the gas supply line 30. Alternatively, curved and/or angled sections of the flow channels of the flow conditioning unit can be provided which extend into the vertical section 61 and perform the directional change in a similar manner as the wall of the channel itself does.

As an alternative to the arrangement of the guide fins described above in the variant in which the flow channels are provided in matrix form, only the second guide fins, which are provided horizontally in the gas supply channel, can also be provided and/or the guide fins can be at least partially and/or at least sectionally tilted, i.e. oblique or angled, or curved. Tilted and/or curved guide fins are preferably designed and arranged in the gas supply channel in such a way that angles formed by the guide fins together with the longitudinal direction of the gas supply channel, i.e. with the first extension direction, are 4° at most. Thus, a detachment of the flow from the guide fins can be reduced or suppressed.

In FIG. 2, the transition from the vertical section 61 of the supply line 30 to the lower horizontal gas supply channel 31 is shown as an abrupt transition, i.e. the vertical section 61 and the lower horizontal gas supply channel 31 are perpendicular to each other and form a sharp bend with an angle of 90°. This is advantageous for the temperature control of the gas by the guide fins of the flow conditioning unit 50, 150 (see above), since a thermal energy transfer between the gas and the temperature-controlled surface increases with increasing degree of turbulence of the gas and the gas stream has a high degree of turbulence, i.e. vortices, due to the abrupt change of direction in this region. Alternatively, the transition from the vertical section 61 to the lower horizontal gas supply channel 31 can also be formed by an additional line section (not shown) that is curved at least in a section thereof and/or step-wise angled, analogous to the transition section 63 between the tubular section 64 and the vertical section 61. The design of the transition from the vertical section 61 of the supply line 30 to the lower horizontal gas supply channel 31 is thus preferably implemented under consideration of an improved heating/cooling effect of an abrupt change of direction of the flow upstream of or in the flow conditioning unit, and the smallest possible disturbance of the flow for improving the flow properties, in particular reduction of vortices in the flow. In FIGS. 2, 3, and 5, the flow conditioning unit 50 is shown to extend into the vertical section 61. Alternatively, two separate flow conditioning units spaced apart from one another can also be provided, a first flow conditioning unit being provided in the lower horizontal gas supply channel 31 and a second flow conditioning unit being provided in the vertical section 61.

Alternatively or in addition to the flow conditioning unit 50 being provided in the lower horizontal gas supply channel 31, a flow conditioning unit can be provided in the upper horizontal gas supply channel 41 (see FIG. 1). For example, the upper horizontal gas supply channel 41 can be designed at least in sections analogous to the lower gas supply channel 31. Therefore, the upper and/or the lower horizontal gas supply channel 41, 31 is also generally referred to as the first line section. Similarly, the vertical section 61 is also referred to as the second line section and the tubular section 64 is referred to as the third section.

As described above, the lower horizontal gas supply channel 31 extends in the x-direction, i.e. in its longitudinal direction, over the entire length L. What is more, the longitudinal direction denotes a straight, i.e. rectilinear, extension direction of the lower horizontal gas supply channel from the first end 31*a* to the second end 31*b*. The cross-sectional area perpendicular to the longitudinal extension or the extension direction has substantially the same geometric shape and size along the entire length L of the lower horizontal gas supply channel 31, i.e. a rectangular shape with constant width B and height G. However, the invention is not limited to a lower horizontal gas supply channel having a constant cross-sectional area. It is also possible for the width B and/or height G to vary along the overall length L as long as the extension direction, which in this case is defined by the centroids of the cross-sectional areas, is rectilinear. In addition, the maximum value of the width expresses that the effective width, i.e. the width usable by the gas stream, in the first subsection 51 is reduced by the flow conditioning unit 50, 150 or its guide fins 54, 154, but that the distance B between the walls in the y-direction, i.e. the maximum value of the width, is nevertheless constant. This applies analogously to the cross-section or a maximum value of the cross-section in the first subsection 51. Furthermore, the invention is not limited to the longitudinal direction of the lower horizontal gas supply channel 31 as the first extension direction of the gas supply line extending parallel to the plane of the build area 10. For example, the longitudinal direction can deviate from the plane of the build area 10 by 1°, 2°, 5° or 10°.

The features of the embodiments and further developments described above can be combined, as far as possible. Also, the vertical section 61 and the lower horizontal gas supply channel 31 can enclose an angle with each other different from 90°, for example an angle in the range between 45° and 135°. Also, the gas supply line can be provided without the vertical section 61 and/or the tubular section 64 and/or the transition section 63.

The lower and/or the upper horizontal gas supply channel 31, 41 can differ from the embodiment described above.

Although the present invention has been described with reference to a laser sintering or laser melting device, it is not limited to laser sintering or laser melting. It can be applied to any process for generatively producing a three-dimensional object by layer-wise application and selective solidification of a building material.

For example, the exposure device can comprise one or several gas or solid-state lasers or any other type of laser such as laser diodes, in particular VCSEL (Vertical Cavity Surface Emitting Laser) or VECSEL (Vertical External Cavity Surface Emitting Laser), or a row of such lasers. In general, the exposure device can be any device that can selectively apply energy as a wave or particle radiation to a layer of the building material. For example, instead of a laser, another light source, an electron beam, or any other energy or radiation source suited to solidify the building material can be used. Instead of deflecting a beam, exposure with a movable line irradiation device can also be applied. The invention can also be applied to selective mask sintering, in which an extended light source and a mask are used, or to high-speed sintering (HSS), in which a material that increases (absorption sintering) or decreases (inhibition sintering) radiation absorption at the corresponding locations is selectively applied to the building material and then exposed non-selectively over a large area or with a movable line irradiation device.

Instead of applying energy, selective solidification of the applied building material can also be implemented by 3D printing, for example by applying an adhesive. In general, the invention relates to the generative production of an object by means of layer-wise application and selective solidification of a building material, regardless of the manner in which the building material is solidified.

The invention claimed is:
1. A flow device for an additive manufacturing device for the production of a three-dimensional object by layer-wise selective solidification of a building material in a build area, the flow device comprising:

a process chamber;

a gas supply device for generating a gas stream in the additive manufacturing device;

at least one gas inlet for introducing the gas stream into the process chamber and at least one gas outlet for directing the gas stream out of the process chamber; and a gas supply line provided outside the process chamber, in order to conduct gas to the at least one gas inlet, the gas supply line comprising at least a first line section that adjoins the gas inlet and that extends a length along a first extension direction of the gas supply line, the first extension direction being substantially straight, wherein the first line section extends a maximum value of a width that extends transverse to the first extension direction and parallel to the build area, and wherein a length of the first line section is at least as large as one half of the maximum value of the width;

wherein the first line section further comprises a first subsection that is arranged at a distance from the gas inlet and that comprises at least a first flow conditioning unit in addition to a wall of the first line section, the first flow conditioning unit being designed to substantially align the gas stream in the first extension direction; and wherein the gas supply line comprises at least a second line section that adjoins the first subsection of the first line section and that extends along a second extension direction of the gas supply line that differs from the first extension direction, and wherein the first flow conditioning unit of the first line section extends into the second line section.

2. The flow device of claim 1, wherein the length of the first line section is at least as large as the maximum value of the width of the first line section.

3. The flow device of claim 1, wherein the first extension direction is substantially parallel to a plane of the build area during operation of the flow device.

4. The flow device of claim 1, wherein the maximum value of the width of the first line section is substantially constant along the length of the first line section; and/or wherein a maximum cross-sectional area of the first line section perpendicular to the first extension direction has a substantially rectangular shape.

5. The flow device of claim 1, wherein the maximum value of the width of the first line section is larger than or equal to a maximum dimension of the build area in a direction parallel to the width of the first line section.

6. The flow device of claim 1, wherein the gas inlet is provided substantially within a lower height region of the process chamber.

7. The flow device of claim 1, wherein the first flow conditioning unit comprises at least one guide element having a guide face and wherein the first flow conditioning unit has at least one of the following properties:

the guide faces of the guide element or of the guide elements are aligned in the first extension direction;

at least two guide elements are arranged spaced apart from one another along the width of the first line section;

at least two guide elements are arranged spaced apart from one another along a height of the first line section, the height being a dimension of the first line section perpendicular to the first extension direction and perpendicular to the width of the first line section and/or of 50 mm at most;

at least two guide elements are arranged separated from each other at least partially and/or at least in some areas;

along the length of the first line section the guide element or the guide elements has/have a dimension of at least 1 cm;

the first flow conditioning unit comprises at least 5 guide elements;

a reduction in a cross-sectional area of the first line section in the first subsection caused by the first flow conditioning unit as compared to a maximum value of the cross-sectional area of the first subsection is at least 1% and/or 30% at most;

at least two guide elements are spaced apart from one another along the width and/or the height of the first line section by a first distance and extend in a direction parallel to the first extension direction by a second distance, the second distance being at least ten times greater than the first distance.

8. The flow device of claim 1, wherein the first flow conditioning unit is connected to a temperature control device or is designed as a temperature control device, the temperature control device being configured to control the temperature of the gas that passes through the gas supply line during operation.

9. The flow device of claim 1, wherein the second extension direction of the second line section and the first extension direction of the first line section enclose an angle in a range between 45° and 135°.

10. The flow device of claim 9, wherein the second line section comprises, in addition to a wall, at least a second flow conditioning unit that is designed to substantially align the gas stream in the second and/or in the first extension direction, and wherein the second flow conditioning unit is provided in a region of the second line section adjoining the first line section.

11. The flow device of claim 9, wherein a maximum value of a width of the second line section transverse to the second extension direction and parallel to the build area is substantially the same as the maximum value of the width of the first line section.

12. The flow device of claim 1, wherein the first line section further comprises a second subsection that adjoins the gas inlet and a volume of which is substantially not divided or that comprises at least a third flow conditioning unit for aligning the gas stream in the first extension direction, wherein the third flow conditioning unit has a length along the first extension direction of less than or equal to 5 cm and is arranged at a distance from the gas inlet.

13. The flow device of claim 12, wherein in the first extension direction the first subsection extends a first length section of the first line section and the second subsection extends a second length section of the first line section and wherein the first length section is larger than or equal to the second length section.

14. An additive manufacturing device for the production of a three-dimensional object having a solidification device for selectively solidifying of a building material layer by layer in a build area, the manufacturing device comprising:

a process chamber;

a gas supply device for generating a gas stream in the additive manufacturing device;

at least one gas inlet for introducing the gas stream into the process chamber and at least one gas outlet for directing the gas stream out of the process chamber; and a gas supply line provided outside the process chamber, in order to conduct gas to the at least one gas inlet, the gas supply line comprising at least a first line section that adjoins the gas inlet and that extends a length along a first extension direction of the gas supply line, the first extension direction being substantially straight, wherein the first line section extends a maximum value of a width that extends transverse to the first extension direction and parallel to the build area, and wherein a length of the first line section is at least as large as one half of the maximum value of the width;

wherein the first line section further comprises a first subsection that is arranged at a distance from the gas inlet and that comprises at least a first flow conditioning unit in addition to a wall of the first line section, the first flow conditioning unit being designed to substantially align the gas stream in the first extension direction; and wherein the gas supply line comprises at least a second line section that adjoins the first subsection of the first line section and that extends along a second extension direction of the gas supply line that differs from the first extension direction, and wherein the first flow conditioning unit of the first line section extends into the second line section.

15. A flow method for generating a gas stream in an additive manufacturing device for producing a three-dimensional object by layer-wise selective solidification of a building material in a build area, the additive manufacturing device comprising a process chamber, and the flow method comprising the following steps:

generating a gas stream in the additive manufacturing device by means of a gas supply device; and conducting the gas stream in a gas supply line to at least one gas inlet and introducing the gas stream through the at least one gas inlet into the process chamber, wherein the gas supply line is provided outside the process chamber, wherein the gas supply line comprises at least a first line section which adjoins the gas inlet and which extends a length along a first extension direction of the gas supply line, the first extension direction being substantially straight;

wherein the first line section extends a maximum value of a width that extends transverse to the first extension direction and parallel to the build area, and wherein the length of the first line section is at least as large as one half of the maximum value of the width;

wherein the first line section further comprises a first subsection that is arranged at a distance from the gas inlet and that comprises at least a first flow conditioning unit in addition to a wall of the first line section; and wherein the gas supply line comprises at least a second line section that adjoins the first subsection of the first line section and that extends along a second extension direction of the gas supply line that differs from the first extension direction, and wherein the first flow conditioning unit of the first line section extends into the second line section;

aligning the gas stream substantially in the first extension direction by means of at least the first flow conditioning unit provided in the first subsection of the first line section in addition to the wall of the first line section, wherein the first subsection is arranged at the distance from the gas inlet; and directing the gas stream out of the process chamber through at least one gas outlet.

16. A manufacturing method for the additive production of a three-dimensional object in an additive manufacturing device with the steps of:

layer-wise application of a building material in a build area so as to establish an applied layer;

selective solidification of the applied layer by means of a solidification device; and repeating the steps of layer-wise application and selective solidification until the three-dimensional object is produced, wherein the additive manufacturing device comprises a process chamber, and wherein the following steps are carried out at least temporarily during the production of the three-dimensional object:

generating a gas stream in the additive manufacturing device by means of a gas supply device;

conducting the gas stream in a gas supply line to at least one gas inlet and introducing the gas stream through the at least one gas inlet into the process chamber, wherein the gas supply line is provided outside the process chamber and wherein the gas supply line comprises at least a first line section which adjoins the gas inlet and which extends a length along a first extension direction of the gas supply line, the first extension direction being substantially straight, wherein the first line section extends a maximum value of a width that extends transverse to the first extension direction and parallel to the build area, and wherein a length of the first line section is at least as large as one half of the maximum value of the width;

wherein the first line section further comprises a first subsection that is arranged at a distance from the gas inlet and that comprises at least a first flow conditioning unit in addition to a wall of the first line section; and wherein the gas supply line comprises at least a second line section that adjoins the first subsection of the first line section and that extends along a second extension direction of the gas supply line that differs from the first extension direction, and wherein the first flow conditioning unit of the first line section extends into the second line section; and aligning the gas stream substantially in the first extension direction by means of at least the first flow conditioning unit provided in the first subsection of the first line section in addition to a wall of the first line section, wherein the first subsection is arranged at the distance from the gas inlet; and directing the gas stream out of the process chamber through at least one gas outlet.

* * * * *